US006822670B2

(12) United States Patent
Hirawa

(10) Patent No.: US 6,822,670 B2
(45) Date of Patent: Nov. 23, 2004

(54) IMAGE RECORDING APPARATUS AND IMAGE RECORDING METHOD

(75) Inventor: Takahide Hirawa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 96 days.

(21) Appl. No.: 10/385,434

(22) Filed: Mar. 12, 2003

(65) Prior Publication Data

US 2003/0179434 A1 Sep. 25, 2003

(30) Foreign Application Priority Data

Mar. 25, 2002 (JP) .................................... P2002-082696
Jan. 17, 2003 (JP) .................................... P2003-009122

(51) Int. Cl.[7] ........................... G02F 1/01; G02B 26/00; G02B 26/02; B41J 2/47; B41J 2/465

(52) U.S. Cl. ........................................ 347/239; 347/255

(58) Field of Search ................................ 347/239, 255; 359/196, 227, 237, 238

(56) References Cited

U.S. PATENT DOCUMENTS 5,872,587 A 2/1999 Fujita et al.
6,195,114 B1 2/2001 Fujita
6,381,062 B1 * 4/2002 Kowarz et al. ............ 359/291

FOREIGN PATENT DOCUMENTS

EP 1 136 272 A2 9/2001
EP 1 136 272 A3 3/2003
JP 63-189271 8/1988

* cited by examiner

*Primary Examiner*—Huan Tran
(74) *Attorney, Agent, or Firm*—McDermott Will & Emery LLP

(57) ABSTRACT

A driving element (120*a*) for driving light modulator elements (121) is provided with a register (441*a*) for storing driving voltage data (301) and clock selection data (303), a clock selection part (442*a*) for selecting an update clock (302) out of a group of control clocks (304) on the basis of the clock selection data (303), and a D/A converter (442*b*), a current source (32) and a resistance (33) for converting the driving voltage data (301) into a driving voltage. The timing of the update clock (302) is shifted by the clock selection data (303), to thereby control a driving timing of each light modulator element (121). This makes it possible to achieve an appropriate writing while suppressing effects of driving characteristics of the light modulator elements (121), the widths of irradiation areas irradiated by the light modulator elements (121) in a scan direction, photosensitive characteristics of a recording medium and the like.

31 Claims, 21 Drawing Sheets

IMAGE RECORDING APPARATUS AND IMAGE RECORDING METHOD

BACKGROUND OF THE INVENTION

1. Field of the Invention

The present invention relates to an image recording apparatus using a plurality of light modulator elements for recording an image on a recording medium.

2. Description of the Background Art

Developed has been a diffraction grating type light modulator element which is capable of changing the depth of grating by alternately forming fixed ribbons and moving ribbons on a substrate with a semiconductor device manufacturing technique and sagging the moving ribbons relatively to the fixed ribbons. It is proposed that such a diffraction grating as above, in which the intensities of a normally reflected light beam and diffracted light beams are changed by changing the depth of grooves, should be used for an image recording apparatus in techniques such as CTP (Computer to Plate) as a switching element of light.

For example, a plurality of diffraction grating type light modulator elements provided in the image recording apparatus are irradiated with light, and then reflected light beams (zeroth order diffracted light beams) from light modulator elements in a state where the fixed ribbons and the moving ribbons are positioned at the same height from a base surface are guided to the recording medium and non-zeroth order diffracted light beams (mainly first order diffracted light beams) from light modulator elements in a state where the moving ribbons are sagged are blocked, to achieve an image recording on the recording medium.

In such a diffraction grating type light modulator element, however, since the driving voltage supplied for the moving ribbons and the amount of sag of the moving ribbons are not in proportion to each other, even if a curve indicating a change in driving voltage at the time when the light modulator element is changed from an ON state (a state where a signal beam is guided from the light modulator element to the recording medium) to an OFF state (a state where no light is guided from the light modulator element to the recording medium) is made equivalent (symmetrical) to a curve indicating a change in driving voltage at the time when the light modulator element is changed from the OFF state to the ON state, changes in intensity of light outputted from the light modulator element in both the cases do not become equivalent (symmetrical) to each other.

Specifically, when the light modulator element is changed from a state where the change in sag of the moving ribbons is large with respect to the change in driving voltage to a state where the change in sag is small, it is hard for the moving ribbons to follow the driving voltage since a large initial acceleration is given to the moving ribbons and this results in excessively quick moving of the moving ribbons and oscillation thereof. As a result, even if the light modulator elements are changed periodically between the ON state and the OFF state, it is hard to write appropriate dots on the recording medium which travels at constant speed relatively to the light modulator elements.

In a case where an image is recorded on the recording medium by using various light modulator elements (including a light modulator element which emits a light such as a laser), not limited to the diffraction grating type one, when the respective areas on the recording medium which are irradiated with lights by a plurality of light modulator elements are different in size, even if the lights are emitted from the light modulator elements with the same intensity at the same timing, disadvantageously, the same drawing can not be performed on the recording medium.

SUMMARY OF THE INVENTION

It is an object of the present invention to achieve an appropriate image recording by using a plurality of light modulator elements.

The present invention is intended for an image recording apparatus for recording an image on a recording medium by exposure.

According to a preferred embodiment of the present invention, the image recording apparatus comprises a light modulator having a plurality of light modulator elements, a holding part for holding a recording medium on which an image is recorded with signal beams from the plurality of light modulator elements, a transfer mechanism for transferring the holding part relatively to the light modulator, a state transition detection circuit for detecting whether or not there is a transition between a state of emitting a signal beam and a state of emitting no signal beam on each of the plurality of light modulator elements, and a control circuit for shifting a transition timing of each element on which the transition is detected in accordance with a detection result of the state transition detection circuit.

In the image recording apparatus of the present invention, it is possible to record an appropriate image while suppressing at least any of effects of the state transition characteristics of each light modulator element, the width of each irradiation area in a scan direction, a positional shift of each irradiation area, the photosensitive characteristics of the recording medium and the like by shifting a transition timing of each light modulator element.

According to one aspect of the present invention, the image recording apparatus further comprises a beam sensor and shift times are calculated on the basis of widths of irradiation areas irradiated by the light modulator elements in the scan direction or positional shifts of the irradiation areas in the scan direction, respectively.

Preferably, each of the plurality of light modulator elements is a light modulator element of diffraction grating type in which strip-like fixed reflection surfaces and strip-like moving reflection surfaces are alternately arranged.

According to another aspect of the present invention, the state transition detection circuit detects a state transition of each of the light modulator elements in a series of points of time, and the control circuit applies an auxiliary driving voltage which is different from a normal driving voltage to each light modulator element on which a specified state transition is detected.

It is also possible to record a fine image pattern with high precision by changing the driving voltage as well as the shift time in transition timing.

Further preferably, the control circuit shifts a driving timing of each light modulator element on which a specified state transition is detected by an auxiliary shift time which is different from a normal shift time.

The present invention is also intended for an image recording method of recording an image on a recording medium with signal beams from a light modulator having a plurality of light modulator elements.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. The First Preferred Embodiment>

Figure 1:
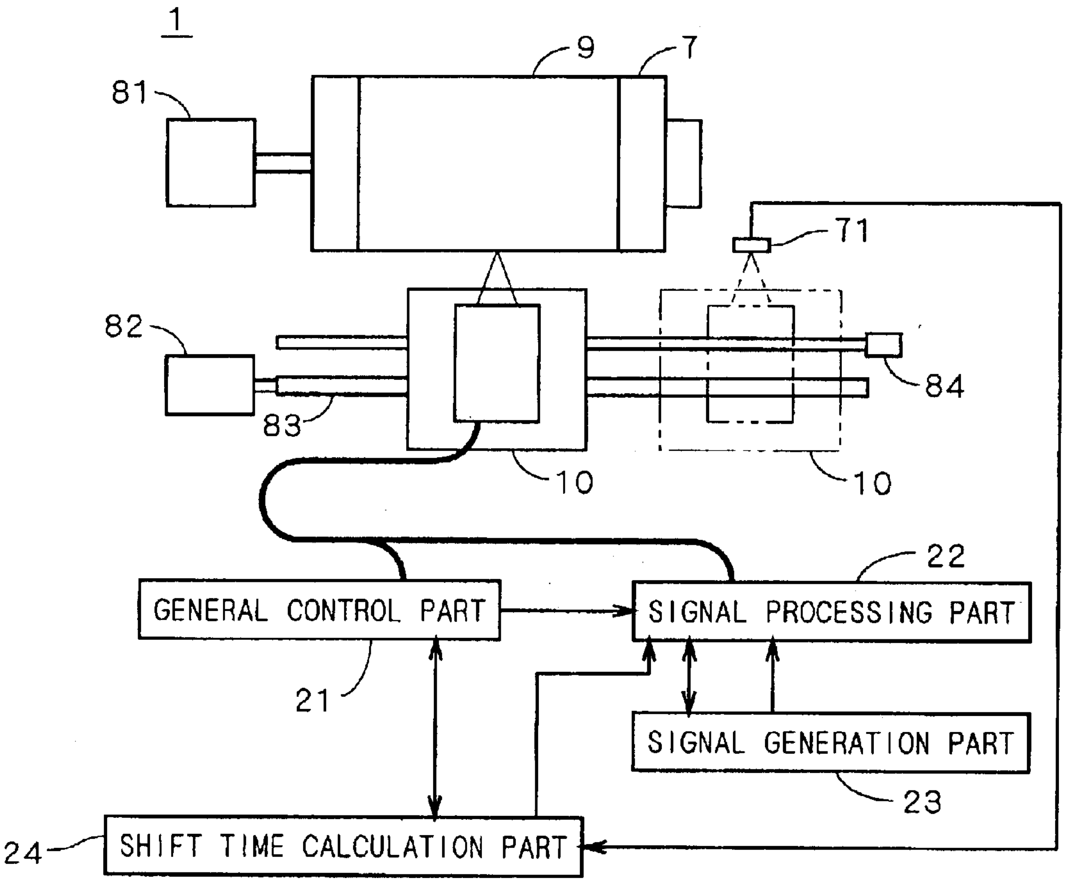
FIG. 1 is a view showing a constitution of an image recording apparatus.

FIG. 1 is a view showing a constitution of an image recording apparatus 1 in accordance with the first preferred embodiment of the present invention. The image recording apparatus 1 has an optical head 10 which emits light for recording an image and a holding drum 7 for holding a recording medium 9 on which an image is recorded by exposure. As the recording medium 9, for example, used are a printing plate, a film for forming the printing plate and the like. A photosensitive drum for plateless printing may be used as the holding drum 7 and in this case, it is understood that the recording medium 9 corresponds to a surface of the photosensitive drum and the holding drum 7 holds the recording medium 9 as a unit.

The holding drum 7 rotates about a central axis of its cylindrical surface holding the recording medium 9 by a motor 81 and the optical head 10 thereby travels relatively to the recording medium 9 in a main scan direction. The optical head 10 can be moved by a motor 82 and a ball screw 83 in parallel to a rotation axis of the holding drum 7 in a subscan direction (orthogonal to the main scan direction). The position of the optical head 10 is detected by an encoder 84. The motors 81 and 82 and the encoder 84 are connected to a general control part 21, and the general control part 21 controls emission of signal beams from the optical head 10 while driving the motor 81, to record an image on the recording medium 9 on the holding drum 7 by light.

Data of the image to be recorded on the recording medium 9 is prepared in a signal generation part 23 in advance, and a signal processing part 22 receives an image signal in synchronization with the signal generation part 23 on the basis of a control signal from the general control part 21. The signal processing part 22 converts the received image signal into a signal for the optical head 10 and then transmits the signal.

At the side of the holding drum 7, a detection part 71 for detecting a light beam from the optical head 10 is provided, and the optical head 10 can be transferred by the motor 82 and the ball screw 83 up to the position where it is opposed to the detection part 71. An output from the detection part 71 is inputted to a shift time calculation part 24. The shift time calculation part 24 is a computer for performing computation with circuits such as a CPU, which generates data for controlling the optical head 10 by computation of the output from the detection part 71.

Figure 2:
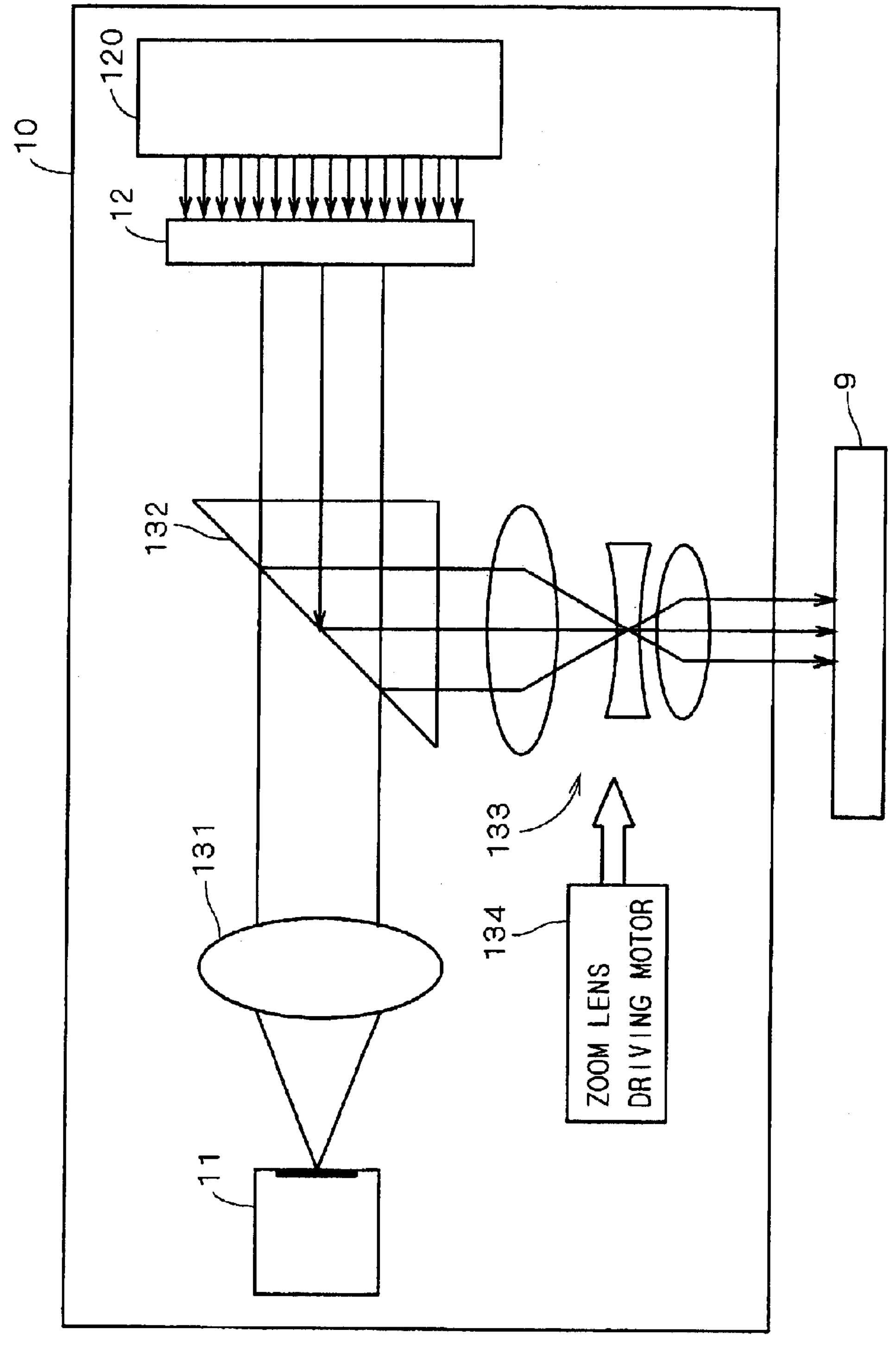
FIG. 2 is a schematic view showing an internal constitution of an optical head.

FIG. 2 is a schematic view showing an internal constitution of the optical head 10. In the optical head 10 disposed are a light source 11 which is a bar-type semiconductor laser, having a plurality of light emitting points which are aligned and a light modurator 12 having a plurality of diffraction grating type light modulator elements which are aligned. Lights from the light source 11 are guided to the light modurator 12 through lenses 131 (actually consisting of a condensing lens, a cylindrical lens and the like) and a prism 132. In this case, the light from the light source 11 is a linear light beam (light beam having a linear section of luminous flux), and applied onto a plurality of light modulator elements which are arranged.

The light modulator elements in the light modulator 12 are individually controlled on the basis of a signal from a device driving circuit 120 and each of the light modulator elements can be changed between a state of emitting a zeroth order diffracted light beam (normally reflected light beam) and a state of emitting non-zeroth order diffracted light beams (mainly first order diffracted light beams ((+1)st order diffracted light beam and (−1)st order diffracted light beam)). The zeroth order diffracted light beam emitted from the light modulator element is returned to the prism 132 and the first order diffracted light beams are guided to directions different from that of the prism 132. The first order diffracted light beams are blocked by a not-shown light shielding part so as not to be stray light.

The zeroth order diffracted light beam from each light modulator element is reflected by the prism 132 and guided to the recording medium 9 outside the optical head 10 through a zoom lens 133 and a plurality of images of the light modulator elements are so formed on the recording medium 9 as to be arranged in the subscan direction. In other words, in the light modulator elements 121, the state of emitting the zeroth order diffracted light beam is an ON state and the state of emitting the first order diffracted light beams are an OFF state. The magnification of the zoom lens 133 can be changed by a zoom lens driving motor 134 and the resolution of the image to be recorded is thereby changed.

Figure 3:
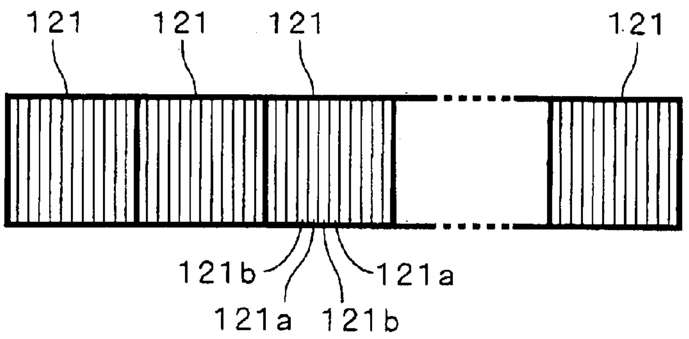
FIG. 3 is an enlarged view of light modulator elements.

FIG. 3 is an enlarged view of the light modulator elements 121 which are arranged. The light modulator element 121 is manufactured by using the semiconductor device manufacturing technique, and each light modulator element 121 is a diffraction grating whose grating depth is changed. In each light modulator element 121, a plurality of moving ribbons 121*a* and a plurality of fixed ribbons 121*b* are alternately arranged in parallel, and the moving ribbons 121*a* can vertically move with respect to a base surface therebehind and the fixed ribbons 121*b* are fixed with respect to the base surface. As the diffraction grating type light modulator element, for example, the GLV (Grating Light Valve) (trademarked by Sillicon Light Machine, Sunnyvale, Calif.) is well known.

Figure 4A:
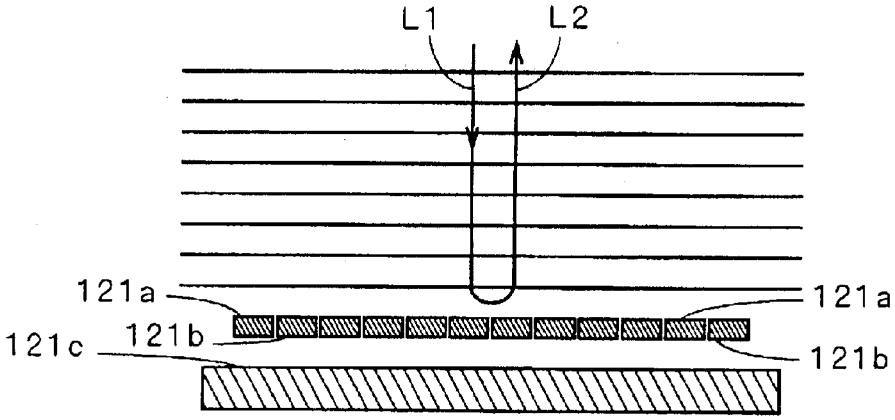
FIG. 4A is a view showing emission of a zeroth order diffracted light beam and FIG. 4B is a view showing emission of first order diffracted light beams.
Figure 4B:
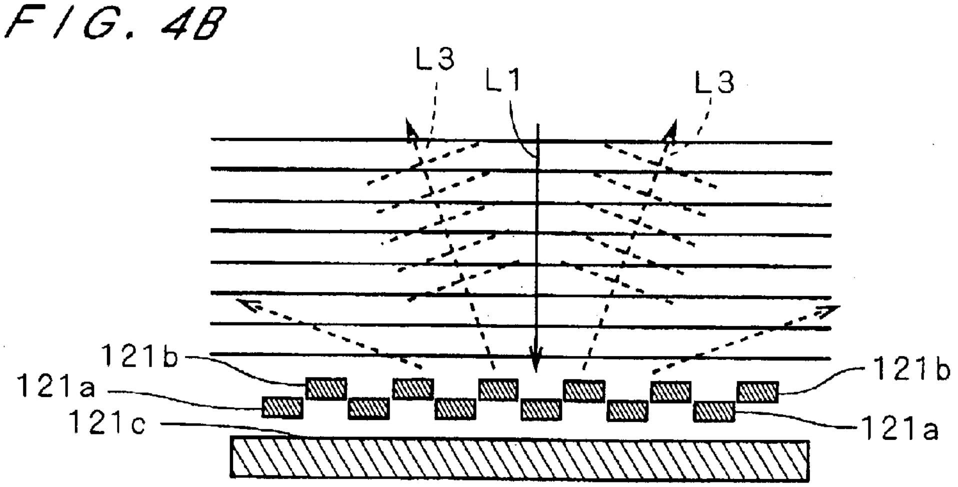

FIGS. 4A and 4B are views each showing a cross section of the light modulator element 121 at a plane perpendicular to the moving ribbons 121*a* and the fixed ribbons 121*b*. As shown in FIG. 4A, when the moving ribbons 121*a* and the fixed ribbons 121*b* are positioned at the same height from a base surface 121*c* (in other words, the moving ribbons 121*a* do not sag), a surface of the light modulator element 121 becomes flush and a reflected light beam of an incident light beam L1 is guided out as a zeroth order diffracted light beam L2. On the other hand, as shown in FIG. 4B, when the moving ribbons 121*a* sag towards the base surface 121*c* with respect to the fixed ribbons 121*b*, the moving ribbons 121*a* serve as bottom surfaces of grooves of the diffraction grating, and first order diffracted light beams L3 (further, high-order diffracted light beams) are guided out from the light modulator element 121 and the zeroth order diffracted light beam L2 disappears. Thus, each light modulator element 121 performs a light modulation using the diffraction grating.

Figure 5:
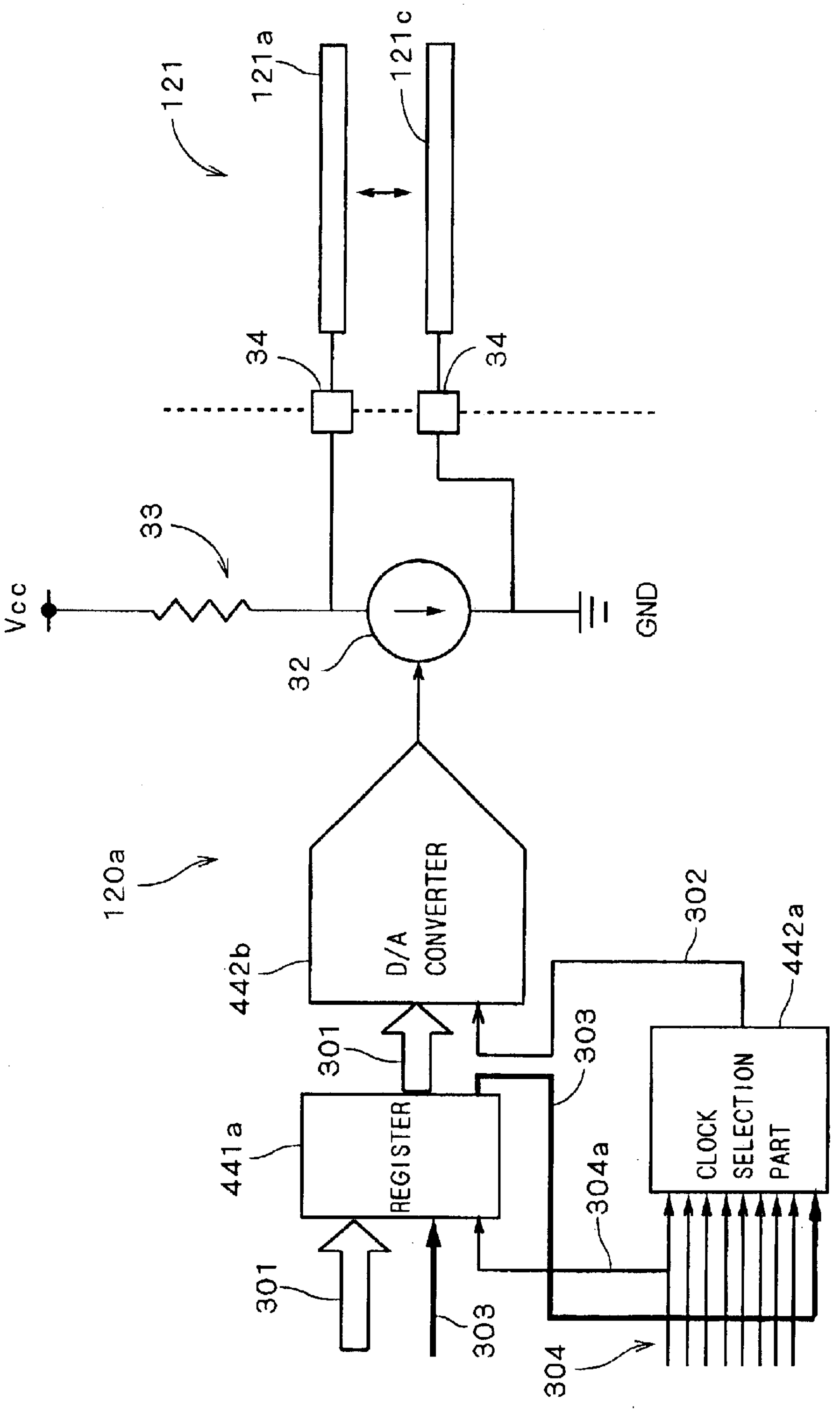
FIG. 5 is a view showing a constitution to drive the light modulator element.

FIG. 5 is a view of a constitution to drive each light modulator element 121, showing an element (hereinafter, referred to as "driving element 120*a*") used for driving operation of the device driving circuit 120. The driving element 120*a* has a register 441*a*, a clock selection part 442*a*, a D/A converter 442*b* and a circuit for converting an output from the D/A converter 442*b* into a driving voltage of the light modulator element 121. Driving voltage data 301 used for generating a predetermined driving voltage and clock selection data 303 used for controlling an operation timing of the light modulator element 121 are inputted to the register 441*a* and a group of control clocks 304 are inputted to the clock selection part 442*a*. The group of control clocks 304 is a set of control clocks which are sequentially shifted by a very short time and a reference control clock 304*a* which indicates the earliest point of time is also inputted to the register 441*a*.

The clock selection data 303 which is temporarily stored in the register 441*a* is inputted to the clock selection part 442*a* in response to the reference control clock 304*a* and one of the group of control clocks 304 is thereby selected. The selected control clock is outputted to the D/A converter 442*b* as an update clock 302.

The driving voltage data 301 is inputted to the D/A converter 442*b* from the register 441*a* and when the update clock 302 is inputted thereto, an analog signal of the driving voltage data 301 is outputted. The driving voltage data 301 for each update clock 302 corresponds to a driving voltage for one operation of driving the light modulator element 121 and an output from the D/A converter 442*b* is inputted to a current source 32 and further converted into a current therein. One end of the current source 32 is connected to a side of high potential Vcc through a resistance 33 and the other end is grounded.

Both ends of the current source 32 are also connected to the moving ribbons 121*a* of the light modulator element 121 and the base surface 121*c*, respectively, through connecting pads 34. Therefore, when the driving voltage data 301 is converted into the current through the D/A converter 442*b* and the current source 32, it is further converted to a driving voltage between both the connecting pads 34 by a voltage drop with the resistance 33. Thus, the driving element 120*a* can control (shift) a driving timing of the light modulator element 121 on the basis of the clock selection data 303.

For example, when eight control clocks (referred to as "clock 0", "clock 1", . . . , "clock 7" from the earliest control clock) are inputted to the clock selection part 442*a* as shown in FIG. 5, the clock 4 is used as an original driving timing and when it is intended to advance the driving timing, the clock 3, the clock 2, the clock 1 and the clock 0 are used in this order. When it is intended to delay the driving timing, the clock 5, clock 6 and the clock 7 are used in this order.

Since there is stray capacitance between the connecting pads 34, the driving voltage changes with the time constant between the connecting pads 34.

Figure 6:
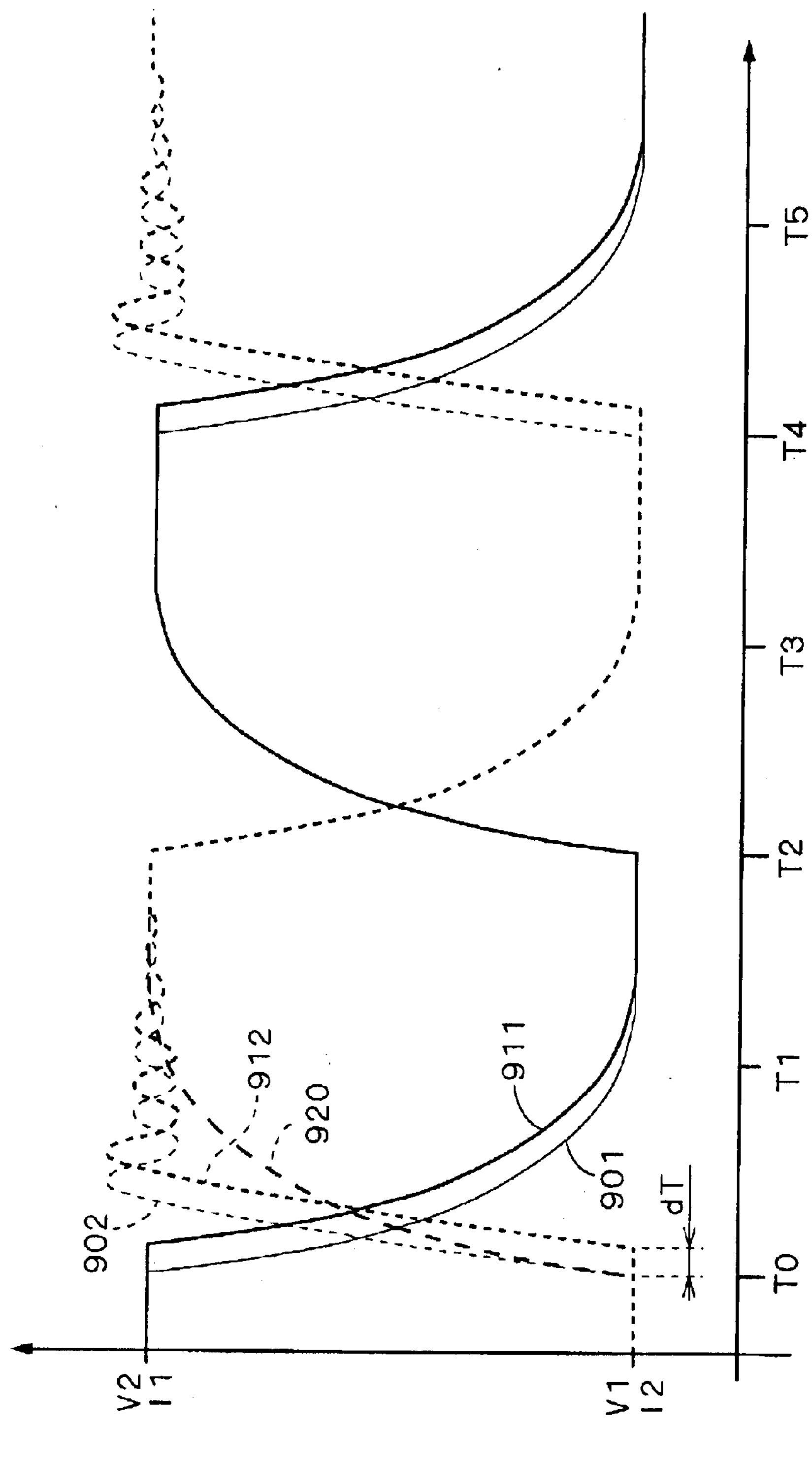
FIG. 6 is a graph showing a relation between a change in driving voltage and an output from the light modulator element.

FIG. 6 is a graph showing a relation between the driving voltage and the intensity (i.e., output) of the signal beam (zeroth order diffracted light beam) from the light modulator element 121, and a thin solid line 901 indicates a change in driving voltage by a background-art method and a thin broken line 902 indicates a change in output in the background art. On the other hand, a thick solid line 911 indicates a change in driving voltage in the first preferred embodiment and a thick (short) broken line 912 indicates a change in output in the first preferred embodiment. In writing clocks (which correspond to the update clocks 302 without timing control) T2 to T4, the solid lines 901 and 911 overlap each other and the broken lines 902 and 912 overlap each other. A thick long broken line 920 shown in the range of writing clock from T0 to T2 indicates a preferable change in output in consideration of the symmetry in ON/OFF of the signal beam. FIG. 6 further shows an operation at the time when the light modulator element 121 changes between the ON state and the OFF state in two writing clocks.

In the vertical axis, reference signs V1 and V2 indicate a driving voltage at the time when the light modulator element 121 emits a signal beam and a driving voltage at the time when the light modulator element 121 emits no signal beam, respectively, and I2 (on the same position as V1) indicates an output corresponding to the driving voltage V2 (i.e., 0).

As shown in FIG. 6, when the light modulator element 121 is driven by the background-art method, if the driving voltage falls from V2 to V1 as indicated by the thin solid lint 901 in the range of writing clock from T0 to T2, the output from the light modulator element 121 sharply rises to make an overshoot and then reaches the intensity I1 (on the same position as V2) while oscillating. On the other hand, if the driving voltage rises from V1 to V2 as indicated in the range of writing clock from T2 to T4, the output from the light modulator element 121 smoothly decreases. Such a phenomenon occurs because the driving voltage and the amount of sag of the moving ribbons 121*a* are not in proportion to each other.

Figure 7:
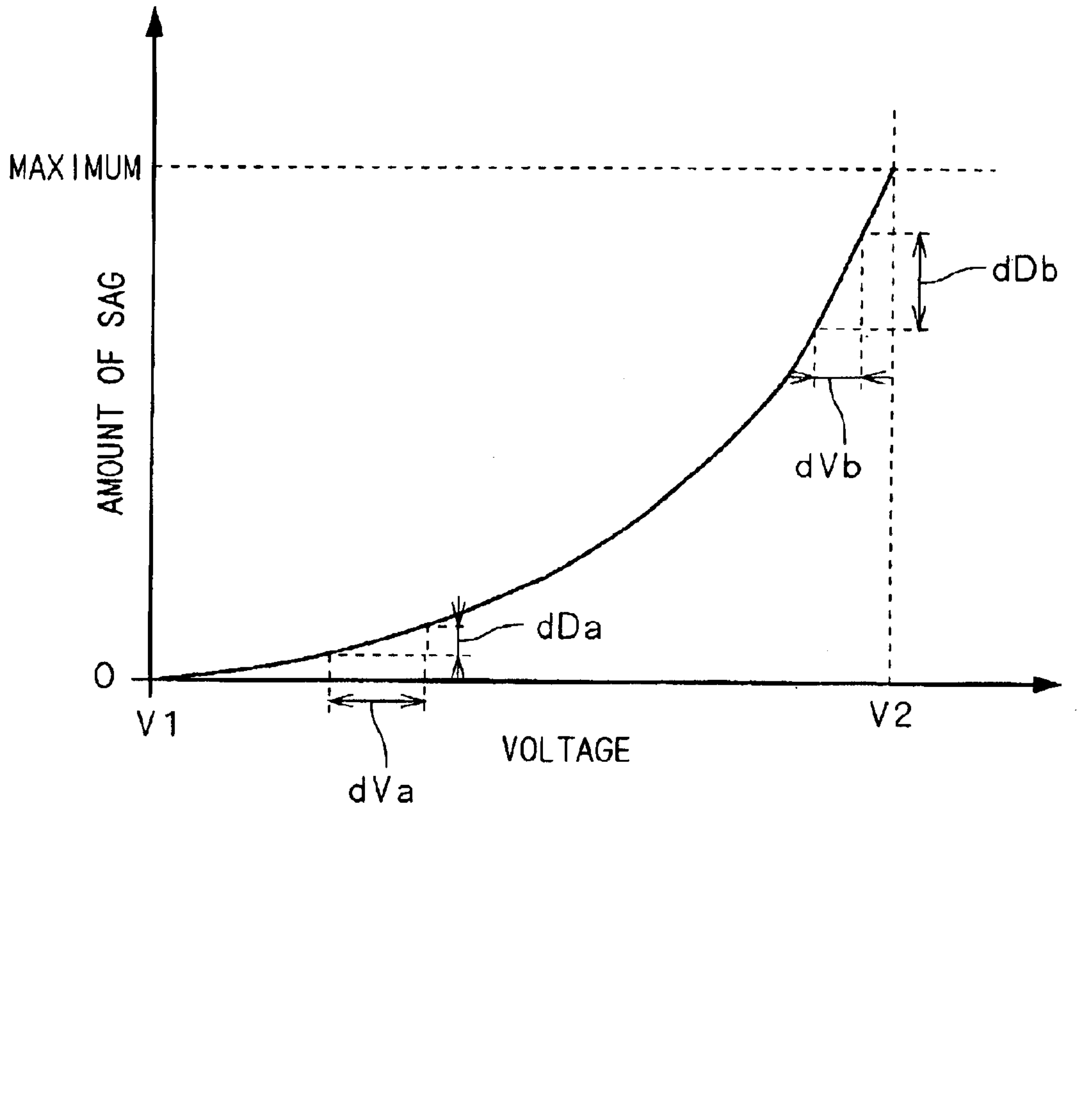
FIG. 7 is a graph showing a relation between a driving voltage and the amount of sag of a moving ribbon.

FIG. 7 is a graph showing a relation between a driving voltage and the amount of sag of the moving ribbon 121*a* (in other words, the level difference between the fixed ribbon 121*b* and the moving ribbon 121*a* with respect to the base surface 121*c*). When the driving voltage is nearly V1 and the light modulator element is almost in the ON state, a change (dDa) in the amount of sag relative to a change (dVa) in driving voltage is very small. In contrast to this, when the driving voltage is nearly V2 and the light modulator element 121 is almost in the OFF state, a change (dDb) in the amount of sag relative to a change (dVb) in driving voltage is large.

Therefore, if the driving voltage simply increases and decreases like in the background-art method, an excessive acceleration is applied to the moving ribbons 121*a* when the driving voltage sharply falls from V2, and the output from the light modulator element 121 sharply changes as indicated by the thin broken line 902 of FIG. 6 in the range of writing clock from T0 to T1 and oscillates due to the effect of the moving ribbons 121*a* which can not follow the sharp change in driving voltage. As a result, the output from the light modulator element 121 draws a curve largely beyond the preferable change in output (indicated by the broken line 920).

The light response characteristics of the recording medium 9 is based on an integral value of the light intensity (i.e., energy per area) on main scanning of an irradiation area, and therefore in the characteristic indicated by the thin broken line 902, a writing (photosensitive) area becomes larger than a blank area even if the change between ON/OFF states is periodically repeated.

When the driving voltage rises from V1 to V2, since the acceleration applied to the moving ribbons 121*a* at an early stage of the change is small, the light modulator element 121 ideally changes into the OFF state.

In the image recording apparatus 1 of the first preferred embodiment, application of the driving voltage V1 is started, lagging behind that in the background art by a very small time dT as indicated by the thick solid line 911 of FIG. 6 in order to suppress the effect of the sharp rise of the output from the light modulator element 121. This allows the recording medium 9 to be supplied with an energy equivalent to that which is supplied to the recording medium 9 in the preferable output change, and an appropriate writing is achieved. There may be a case where the energy to be supplied to the recording medium 9 is controlled by advancing the fall of the light modulator element 121.

Figure 8:
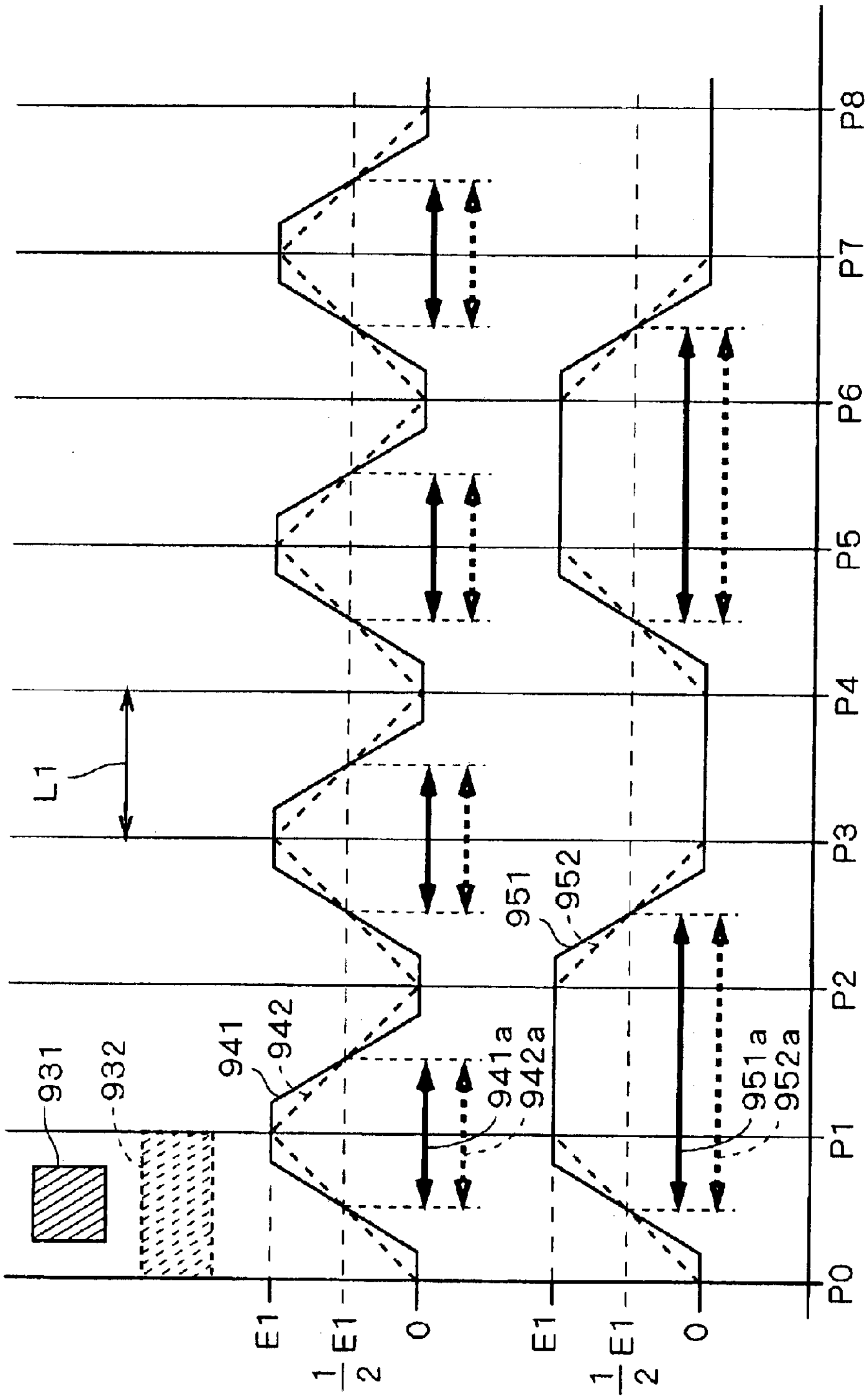
FIG. 8 is a chart showing a relation between the length of an irradiation area irradiated by a light modulator element in a main scan direction and the length of written dot in the main scan direction.
Figure 9:
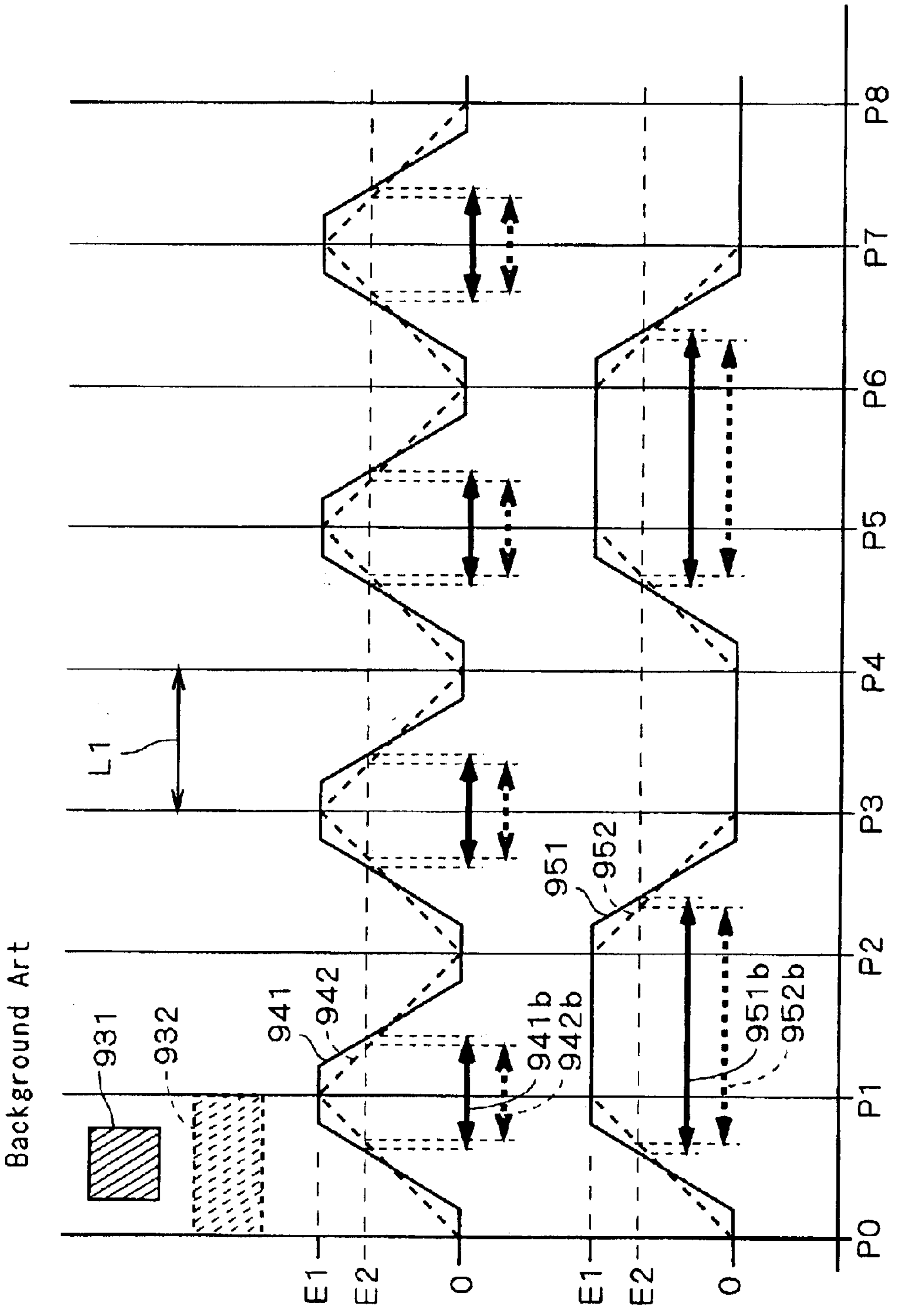
FIG. 9 is a chart showing a relation between the length of an irradiation area irradiated by a light modulator element in the main scan direction and the length of written dot in the main scan direction in a conventional control.
Figure 10:
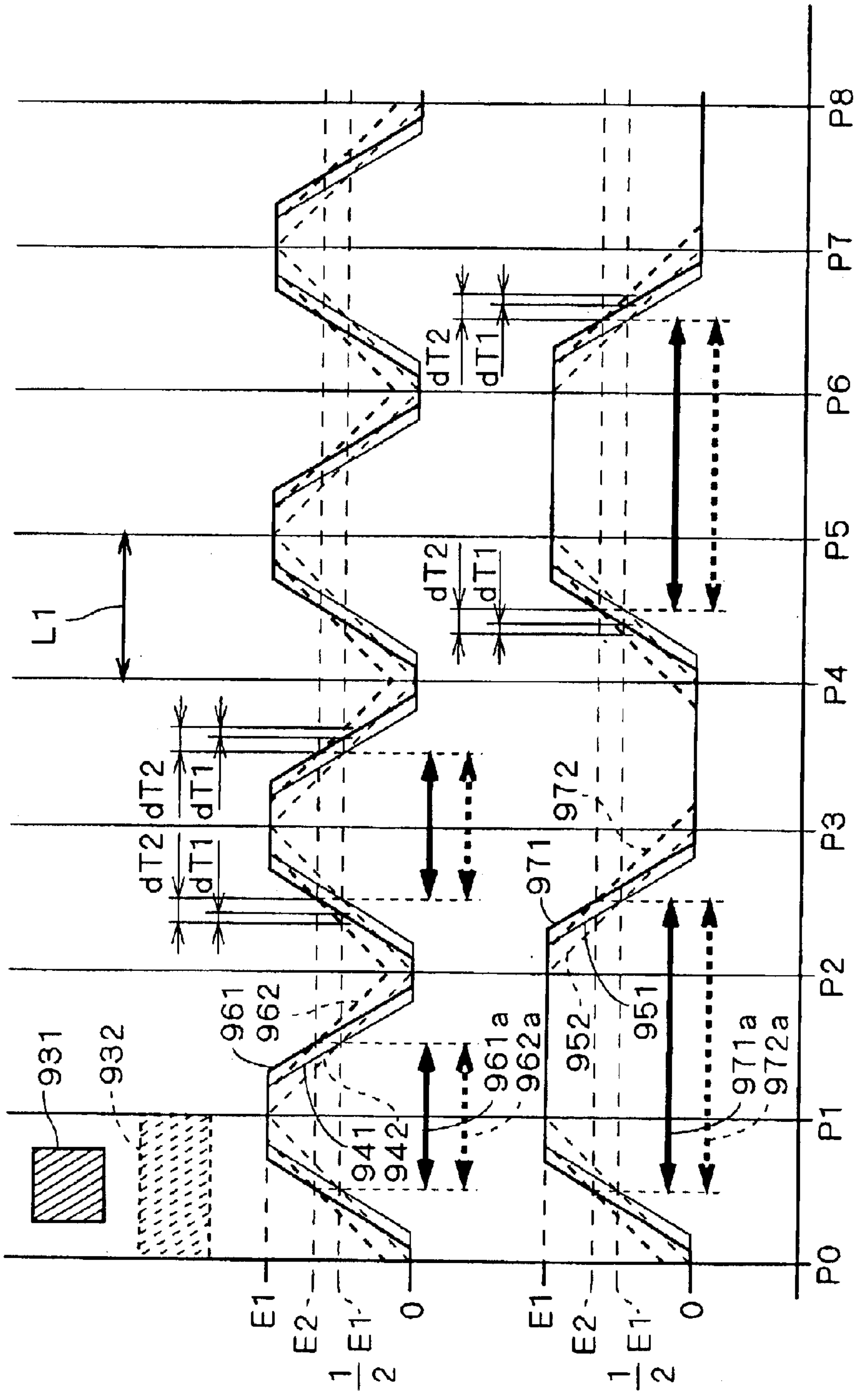
FIG. 10 is a chart showing a relation between the length of an irradiation area irradiated by a light modulator element in the main scan direction and the length of written dot in the main scan direction in accordance with a first preferred embodiment.

Next, another problem in the background-art method of controlling the light modulator element 121 and a control manner in the image recording apparatus 1 of the first preferred embodiment will be discussed. FIGS. 8 to 10 are charts each showing a relation between the length of an area of the recording media 9 which is irradiated with a signal beam from one light modulator element 121 in the main scan direction and the length of dot written on the recording medium 9 in the main scan direction.

The horizontal axis of FIG. 8 indicates the position on the recording medium 9 in the main scan direction and each center between positions represented by reference signs P0 to P8 is a center position of the signal beam at every one writing clock. In other words, the distance represented by reference sign L1 is a distance traveled by the recording medium 9 in the main scan direction for one writing clock. An area represented by numeral 931 in FIG. 8 schematically shows that the length of an irradiation area of a signal beam (hereinafter, referred to as a "first signal beam") in the main scan direction is ½·L1, and an area represented by numeral 932 schematically shows that the length of an irradiation area of a signal beam (hereinafter, referred to as a "second signal beam") in the main scan direction is L1. The first signal beam and the second signal beam have the same light intensity and supply the recording medium 9 with the same energy per unit time (in other words, the light intensity of the first signal beam per unit area is twice as strong as that of the second signal beam).

A solid line 941 and a broken line 942 indicate the amounts of energy per area (hereinafter, referred to simply as "the amounts of energy") which are supplied to the recording medium 9 when the first signal beam and the second signal beam are turned ON between the positions P0 and P1 and then repeatedly turned OFF/ON in an alternate manner at every one writing clock, respectively. A solid line 951 and a broken line 952 indicate the amounts of energy which are supplied to the recording medium 9 when the first signal beam and the second signal beam are turned ON between the positions P0 and P2 and then repeatedly turned OFF/ON in an alternate manner at every two writing clocks, respectively.

This line chart showing the changes in the amount of energy is made, in disregard of the transition curve at the time when the light modulator element 121 is switched between the ON and OFF states (see FIG. 6), assuming that the switching between the ON and OFF states is made instantaneously.

When the amount of energy required to expose the recording medium 9 is half of the maximum amount of energy E1, the lengths of dots written on the recording medium 9 with the first and second signal beams in the main scan direction in the changes indicated by the solid line 941 and the broken line 942 are a length (L1) indicated by a thick solid line 941*a* and a thick broken line 942*a*, being equal to each other. The lengths of dots written on the recording medium 9 with the first and second signal beams in the main scan direction in the changes indicated by the solid line 951 and the broken line 952 are a length (2·L1) indicated by a thick solid line 951*a* and a thick broken line 952*a*, being equal to each other. In other words, when the threshold value of energy required to expose the recording medium 9 is half of the maximum amount of energy, even if the respective lengths of the signal beams in the main scan direction are different, uniform dots can be written if the signal beams have the same light intensity.

When the threshold value of energy for the recording medium 9 is not ½·E1 but an amount E2 which is larger than ½·E1 as shown in FIG. 9, however, the respective lengths of dots written with the first and second signal beams in the main scan direction are different as indicated by a solid line 941*b* and a broken line 942*b*. Also when switching of the signal beam between the ON and OFF states is made at every two writing clocks, the respective lengths of dots in the main scan direction are different as indicated by a solid line 951*b* and a broken line 952*b*.

Then, in the image recording apparatus 1 of the first preferred embodiment, by controlling the timing of switching of the signal beam between the ON and OFF states (shifting in time), it becomes possible to write dots whose lengths in the main scan direction are equal to one another, with a plurality of signal beams having a certain light intensity without being affected by photosensitive characteristics of the recording medium 9.

FIG. 10 shows a change in the amount of energy supplied to the recording medium 9 in the image recording apparatus 1. A solid line 961 indicates a change in the amount of energy when the first signal beam is used and a broken line 962 indicates a change in the amount of energy when the second signal beam is used.

The solid line 961 is obtained by advancing the rise timing (the timing of transition from the OFF state to the ON state) of the light modulator element 121 by dT1 of FIG. 10 (exactly indicating the distance traveled by the recording medium 9 for a time period dT1) as compared with the operation indicated by the solid line 941 and delaying the fall timing (the timing of transition from the ON state to the OFF state) by dT1. On the other hand, the broken line 962 is obtained by advancing the rise timing of the light modulator element 121 by dT2 as compared with the operation indicated by the broken line 942 and delaying the fall timing by dT2. Since the positions on the recording medium 9 where the amount of energy is E2 in the solid line 961 and the broken line 962 coincide with each other, the lengths of dots written with the first signal beam and the second signal beam in the main scan direction are both L1 as indicated by a thick solid line 961*a* and a thick broken line 962*a*, and therefore an appropriate image recording is achieved.

Similarly, by advancing the rise timing of the light modulator element 121 by dT1 as compared with the operation indicated by the solid line 951 and delaying the fall timing by dT1 as indicated by a solid line 971, the length of dot written with the first signal beam in the main scan direction becomes 2·L1 as indicated by a thick solid line 971*a*, and by advancing the rise timing of the light modulator element 121 by dT2 as compared with the operation indicated by the solid line 952 and delaying the fall timing by dT2 as indicated by a solid line 972, the length of dot written with the second signal beam in the main scan direction is 2·L1 as indicated by a thick solid line 972*a*.

Thus, the image recording apparatus 1 can achieve an appropriate image recording while suppressing the effects of the photosensitive characteristics of the recording medium 9 and the length of the irradiation area in the main scan direction by controlling (shifting) the rise and fall timings of the light modulator element 121 in accordance with the threshold value in exposure of the recording medium 9 and the length of the irradiation area of the signal beam in the main scan direction. Though discussion with reference to FIG. 10 is made assuming that the transition of the signal beam between the ON and OFF states is instantaneously performed, the timing of transition from the OFF state to the ON state and the timing of transition from the ON state to the OFF state are, actually, controlled individually in accordance with the state transition characteristics (see FIG. 6).

Even if the irradiation area of the signal beam is positionally shifted in the main scan direction, an appropriate image recording can be achieved by timing control. When the irradiation area of the signal beam from one of the light modulator elements 121 is shifted in the main scan direction behind the irradiation areas of the signal beams from the other light modulator elements 121, for example, the timing of transition between the ON and OFF states of the signal beam from the one light modulator element 121 is advanced as compared with the operation timing of the other light modulator elements 121.

Figure 11:
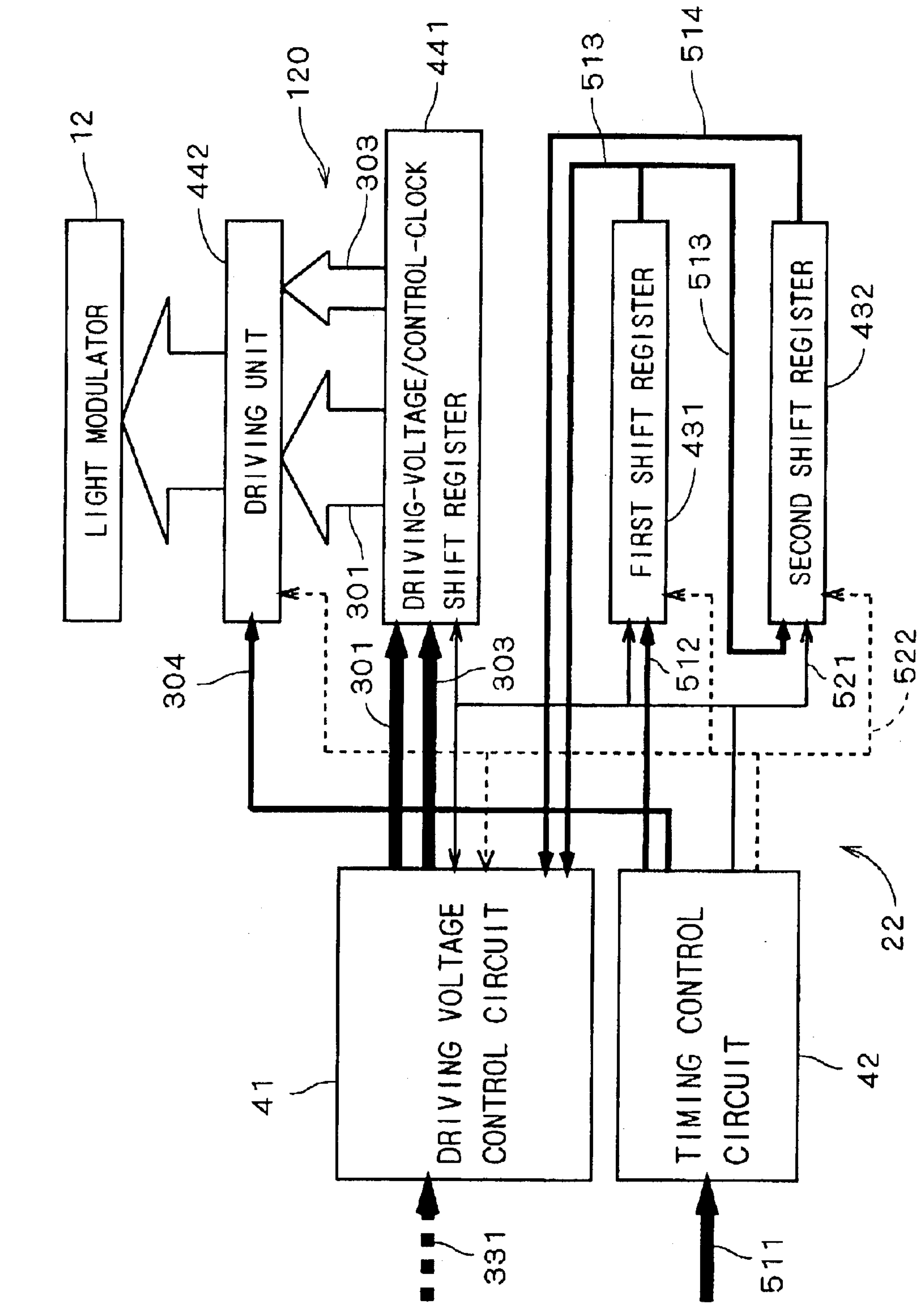
FIG. 11 is a block diagram showing constitutions of a signal processing part and a device driving circuit.

FIG. 11 is a block diagram showing constitutions of the signal processing part 22 (see FIG. 1) and the device driving circuit 120 together with the light modulator 12. The signal processing part 22 has a driving voltage control circuit 41 having various tables, a timing control circuit 42 to which an image signal 511 is inputted from the signal generation part 23, a first shift register 431 which sequentially stores pixel data 512 outputted from the timing control circuit 42 and a second shift register 432 which sequentially stores pixel data 513 outputted from the first shift register 431. The device driving circuit 120 has a driving-voltage/control-clock shift register 441 which sequentially stores data outputted from the driving voltage control circuit 41 and a driving unit 442. The driving-voltage/control-clock shift register 441 is an array of registers 441*a* shown in FIG. 5 and the driving unit 442 is an array of the clock selection parts 442*a* and the D/A converters 442*b*.

From the timing control circuit 42, the pixel data 512 for instructing each light modulator element 121 of ON/OFF and a shift clock 521 are outputted, and the shift clock 521 is inputted to the driving voltage control circuit 41, the first shift register 431, the second shift register 432 and the driving-voltage/control-clock shift register 441. A control signal 522 is also outputted from the timing control circuit 42 and given to the elements.

The first shift register 431 stores the pixel data 512 sequentially while shifting the data 512 in synchronization with the shift clock 521. Thus, the first shift register 431 can store the pixel data as many as the light modulator elements 121 at one time. Then, the first shift register 431 outputs pixel data 513 which is first inputted thereto among the stored pixel data to the driving voltage control circuit 41 and the second shift register 432 in synchronization with the shift clock 521. The second shift register 432 can also store the pixel data as many as the light modulator elements 121 at one time, and outputs pixel data 514 which is first inputted thereto among the stored pixel data to the driving voltage control circuit 41 in synchronization with the shift clock 521. In the first and second shift registers 431 and 432, zeros (data indicating OFF) are stored in advance as initial values.

Figure 12:
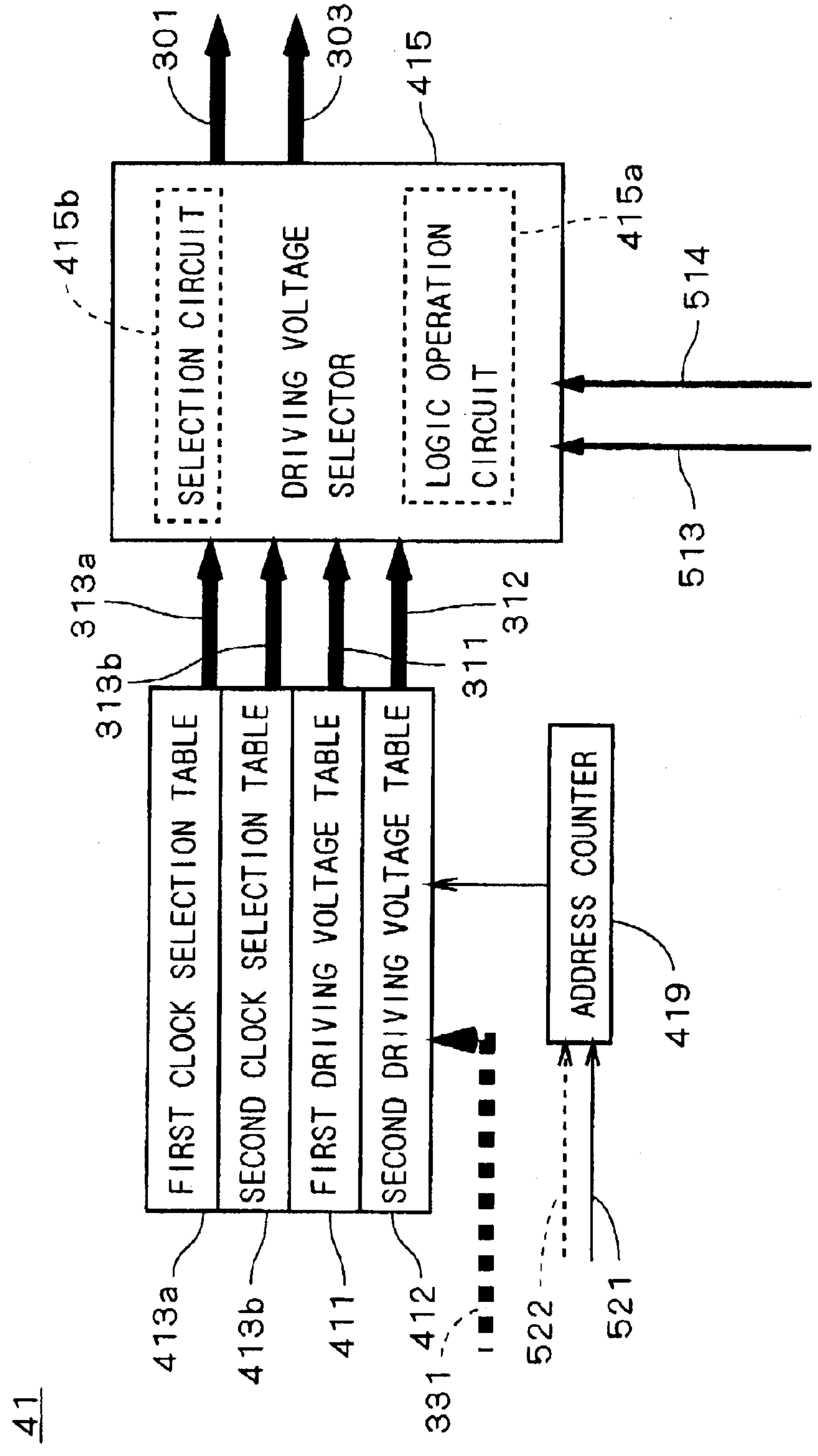
FIG. 12 is a block diagram showing a constitution of a driving voltage control circuit.

The driving voltage control circuit 41 is a circuit for generating the driving voltage data 301 which corresponds to the driving voltage supplied for each light modulator element 121 and the clock selection data 303 for indicating the timing of state transition of the light modulator elements 121, to which look-up table (LUT) data 331 is inputted in advance. FIG. 12 is a block diagram showing a constitution of the driving voltage control circuit 41.

The driving voltage control circuit 41, as LUTs, has a first driving voltage table 411 ("table" correctly refers to a "memory" storing the table, but the memory is referred to simply as "table" in the following discussion) for storing data (hereinafter, referred to as "first driving voltage data") which corresponds to the first driving voltages which are applied to bring light modulator elements 121 into the ON state, a second driving voltage table 412 for storing data (hereinafter, referred to as "second driving voltage data") which corresponds to the second driving voltages which are applied to bring light modulator elements 121 into the OFF state, a first clock selection table 413*a* for storing data used for selecting control clocks which correspond to the shift times in rise timing of light modulator elements 121 (hereinafter, referred to as "first clock selection data") and a second clock selection table 413*b* for storing data used for selecting control clocks which correspond to the shift times in fall timing of light modulator elements 121 (hereinafter, referred to as "second clock selection data").

The driving voltage control circuit 41 is further provided with an address counter 419 for specifying the light modulator element 121 to be controlled by the outputted driving voltage data 301 and a driving voltage selector 415 for making a selection of the driving voltage data to be inputted from the first driving voltage table 411 and the second driving voltage table 412 (and clock selection data to be inputted from the first clock selection table 413*a* and the second clock selection table 413*b*).

The first driving voltage data is separately obtained in advance by a method discussed later for each light modulator element 121 as the first driving voltage which equalizes the intensity of light beams from the light modulator elements 121 which are in the ON state, and the second driving voltage data is separately obtained in advance for each light modulator element 121 as the second driving voltage which makes the intensity of light beams zero, which are outputted from the light modulator elements 121 which are in the OFF state. The first clock selection data and the second clock selection data are also obtained in advance by a method discussed later in order to achieve appropriate length of writing by each light modulator element 121 in the main direction.

Then, the first driving voltage data, the second driving voltage data, the first clock selection data and the second clock selection data on all the light modulator elements 121 which are prepared as the LUT data 331 are inputted to the driving voltage control circuit 41 and stored in the first driving voltage table 411, the second driving voltage table 412, the first clock selection table 413*a* and the second clock selection table 413*b*, respectively.

When the shift clock 521 and the control signal 522 are inputted to the driving voltage control circuit 41, the light modulator element 121 corresponding to the driving voltage data 301 which is outputted is first specified by the address counter 419 (in other words, the addresses of the first driving voltage table 411, the second driving voltage table 412, the first clock selection table 413*a* and the second clock selection table 413*b* which correspond to the light modulator element 121 to be controlled are specified).

With this, the first driving voltage table 411 and the second driving voltage table 412 output the first driving voltage data 311 and the second driving voltage data 312 corresponding to the objective light modulator element 121 to the driving voltage selector 415, respectively, and the first clock selection table 413*a* and the second clock selection table 413*b* output first clock selection data 313*a* and second clock selection data 313*b* corresponding to the objective light modulator element 121 to the driving voltage selector 415, respectively.

The pixel data 513 and 514 are further inputted from the first shift register 431 and the second shift register 432, respectively, to the driving voltage selector 415. The pixel data 513 is data for indicating the state of the light modulator element 121 after being controlled from this time on, and the pixel data 514 outputted from the second shift register 432, which is inputted to the driving voltage control circuit 41 behind the pixel data 513 by the number of light modulator elements 121, is data which corresponds to a current state of the light modulator element 121 (after being controlled in the past). Accordingly, the first driving voltage data 311 is selected by the driving voltage selector 415 when the pixel data 513 is "1" (indicating the ON state) and the second driving voltage data 312 is selected when the pixel data 513 is "0" (indicating the OFF state), and the selected driving voltage data is outputted as the driving voltage data 301.

On the other hand, when the pixel data 514 is "0" and the pixel data 513 is "1", since the light modulator element 121 rises, the first clock selection data 313*a* is selected by the driving voltage selector 415 and outputted as the clock selection data 303. When the pixel data 514 is "1" and the pixel data 513 is "0", since the light modulator element 121 falls, the second clock selection data 313*b* is selected and outputted as the clock selection data 303. When both the pixel data 513 and 514 are "1" or "0", since the light modulator element 121 makes no state transition, the clock selection data 303 for selecting a control clock which performs no control (shift) of the transition timing (the clock 4 among the clocks 1 to 7 as discussed above) is outputted, for convenience of operation.

The driving voltage data 301 and the clock selection data 303 are sequentially stored into the driving-voltage/control-clock shift register 441 shown in FIG. 11 in synchronization with the shift clock 521. The process operation up to this point is a serial process, but when the driving voltage data 301 and the clock selection data 303 as many as the light modulator elements 121 are stored into the driving-voltage/control-clock shift register 441, these data are transmitted to the driving unit 442 in response to the reference control clock 304*a*, as discussed with reference to FIG. 5, and then the control clock is selected out of the group of control clocks 304 in accordance with the clock selection data 303 and a driving voltage in accordance with the driving voltage data 301 is supplied to each light modulator element 121 at the timing of the selected control clock.

With this, the rise timing of the light modulator element 121 is shifted by the amount indicated by the first clock selection data and the fall timing is shifted by the amount indicated by the second clock selection data. As a result, it is possible to perform a writing while suppressing effects of the state transition characteristics between the ON and OFF states of the light modulator element 121, the length of the irradiation area of the signal beam in the main scan direction, the photosensitive characteristics of the recording medium 9 and the like and increase the line space ratio in the main scan direction (the area ratio between a linear area (which is longer in the subscan direction) which is sequentially written in the main scan direction when all the light modulator elements 121 are turned ON/OFF at the same time at every unit of time for writing and a blank area) (i.e., approximate the line space ratio to 1).

When the above operation is seen from a functional point of view with reference to FIGS. 11 to 13, the second shift register 432 is a memory for storing a state of a plurality of light modulator elements 121 at one point of time and the first shift register 431 is a memory for storing a state of a plurality of light modulator elements 121 at the next point of time (one writing clock later), and a logic operation circuit 415*a* in the driving voltage selector 415 uses the stored contents in these shift registers as selection conditions to detect whether or not there is a state transition of each light modulator element 121 (Step S11). Then, a selection circuit 415*b* in the driving voltage selector 415 uses the signals from the first clock selection table 413*a* and the second clock selection table 413*b* as selection objects to substantially determine the shift time in transition timing (Step S12), and a driving voltage is supplied to the light modulator element at the timing which reflects the shift time (Step S13), to achieve the control (shift) in transition timing.

Since the initial values, zeros, are set to the first shift register 431 and the second shift register 432, the transition from the OFF state to the ON state immediately after the beam writing (image recording) starts can be detected.

Next discussion will be made on a principle on which the first driving voltage data, the second driving voltage data, the first clock selection data and the second clock selection data which are above discussed are obtained by the detection part 71 and the shift time calculation part 24 shown in FIG. 1.

Figure 14:
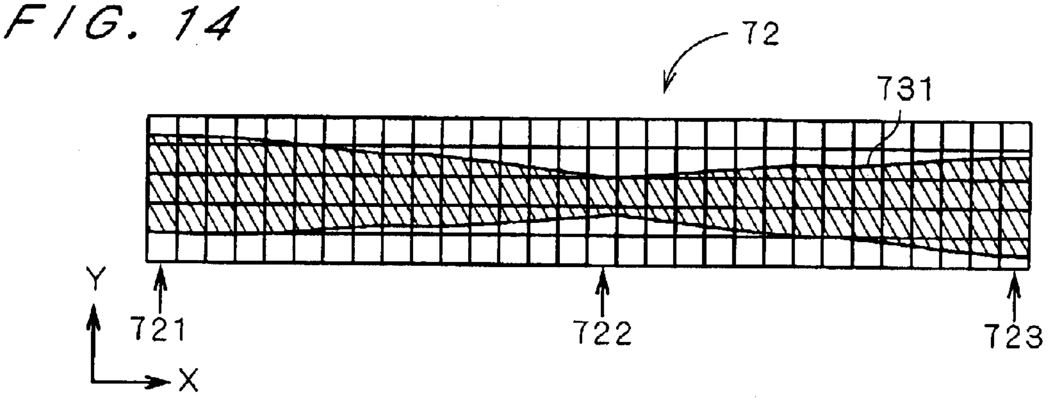
FIG. 14 is a view showing a state where a group of light receiving elements are irradiated with signal beams from all light modulator elements.

FIG. 14 shows a state where the detection part 71 is irradiated with signal beams when the optical head 10 is transferred to the position where it is opposed to the detection part 71 and all the light modulator elements 121 are brought into the ON state. As shown in FIG. 14, the detection part 71 has a group of light receiving elements 72 in which several light receiving elements are arranged in the main scan direction (Y direction) and many light receiving elements are arranged in the subscan direction (X direction), and the group of light receiving elements 72 are irradiated with light beams from all the light modulator elements 121. In FIG. 14, an irradiation area 731 is hatched.

The shift time calculation part 24 first obtains the sum of the amounts of lights received by the light receiving elements arranged in the main scan direction at each position in the subscan direction. With this, the intensity distribution of the signal beams from all the light modulator elements 121 in the subscan direction is obtained. Next, from the intensity distribution in the subscan direction, the light intensity of the signal beam at a position in the subscan direction corresponding to each light modulator element 121 is obtained and such first driving voltages to be applied to the light modulator elements 121 as to uniformize the light intensities of the signal beams from the light modulator elements 121 are calculated. Repeating the above operation, first driving voltages are obtained with high accuracy.

Since there is few variation in output characteristics relatively to the voltage of each light modulator element 121, a second driving voltage is obtained on the basis of the first driving voltage. Then, the first driving voltage data and the second driving voltage data are calculated on the basis of the first driving voltage and the second driving voltage of each light modulator element 121.

Subsequently, on the basis of the amount of lights received by light receiving elements arranged in the main scan direction at each position in the subscan direction, obtained is the width and the center position (or barycenter of light intensity) of the signal beam from each light modulator element 121 in the main scan direction. In the case of FIG. 14, the width of the irradiation area 731 in the main scan direction is detected to be approximately the size of three light receiving elements at both the end positions 721 and 723 in the subscan direction, and the width in the main scan direction is detected to be approximately the size of one light receiving element at the center position 722 in the subscan direction. It is detected that the irradiation area 731 is shifted at the position 723, in the (−Y) direction by approximate size of one light receiving element, as compared with the position 721. Then, such first clock selection data and second clock selection data are obtained for each light modulator element 121 as to suppress the effect of the width and the shift of the signal beam in the main scan direction and the effect of the photosensitive characteristics of the recording medium 9, the state transition characteristics of the light modulator element 121 and the like.

Figure 15:
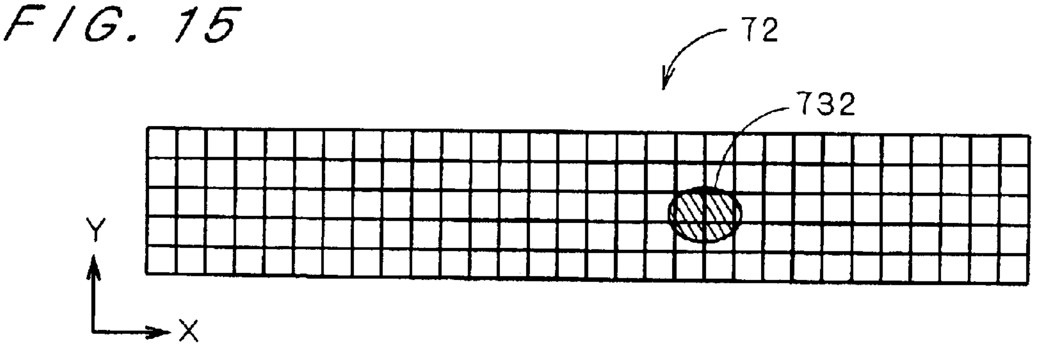
FIG. 15 is a view showing a state where a group of light receiving elements are irradiated with a signal beam from a light modulator element.

The method of FIG. 14 has an advantage that approximate values of various data can be obtained at one time. FIG. 15 is a view used for explaining a method for obtaining various data with higher accuracy by bringing the light modulator elements 121 in the ON state one by one (or by some elements insofar as the signal beams do not interfere with one another). In FIG. 15, an irradiation area 732 of a signal beam at the time when one light modulator element 121 is turned ON is hatched.

The shift time calculation part 24 first obtains the sum of the outputs from all the light receiving elements and calculates the light intensity of the signal beam from one light modulator element 121. Subsequently, on the basis of the output from each light receiving element, the width of the irradiation area 732 in the subscan direction (X direction) is obtained. Since an approximate peak value of the intensity distribution of the signal beam in the irradiation area 732 can be calculated from the width of the irradiation area 732 in the subscan direction and the light intensity of the signal beam (in other words, when the light intensity is constant, the peak value becomes smaller as the width in the subscan direction increases), the first driving voltage is calculated on the basis of the obtained peak value. With this, such first driving voltage data as to uniformize the dot width in the subscan direction is obtained. After that, the second driving voltage data is obtained on the basis of the first driving voltage data.

On the other hand, on the basis of the output of each light receiving element, obtained are the width and the center position (or barycenter of light intensity) of the irradiation area 732 in the main scan direction. On the basis of these information, the peak value and the like, the shift times in rise timing and fall timing of each light modulator element 121 are obtained as the first clock selection data and the second clock selection data. As a result, it becomes possible to suppress the effect of the widths and the shifts of the signal beams in the main scan direction, the effect of the widths of the signal beams in the subscan direction, the effect of the photosensitive characteristics of the recording medium 9 and the effect of the state transition characteristics of the light modulator elements 121.

<2. The Second Preferred Embodiment>

Next, an image recording apparatus 1 of the second preferred embodiment will be discussed. The image recording apparatus 1 of the second preferred embodiment can record a fine image pattern with high precision while shifting the transition timing in accordance with the state transition of each light modulator element. The basic constitution of the image recording apparatus 1 of the second preferred embodiment is the same as that of the first preferred embodiment and constituent elements identical to those of the first preferred embodiment are represented by the same reference signs in the following description.

Figure 16:
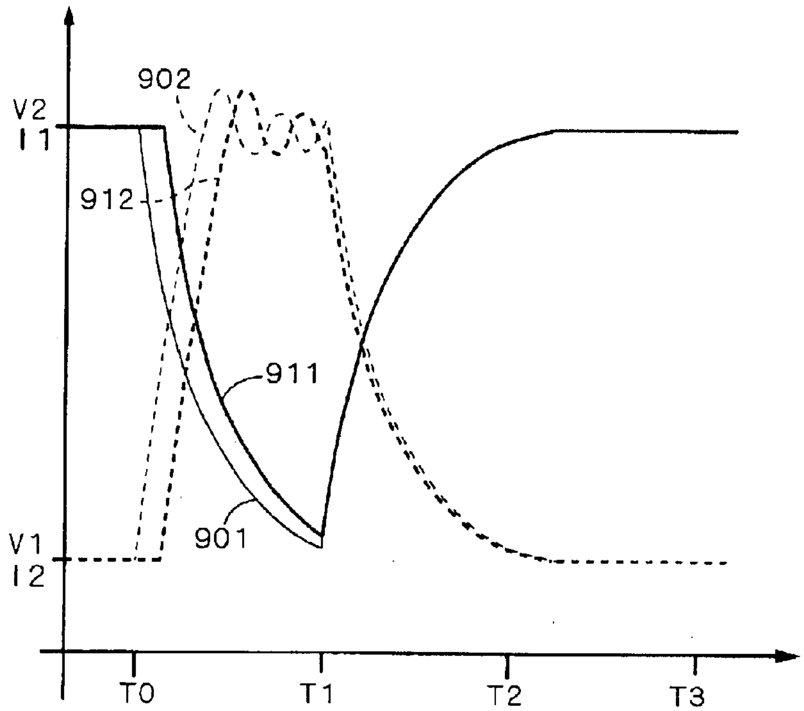
FIGS. 16 and 17 are graphs each showing a relation between a change in driving voltage and an output from the light modulator element.

FIG. 16 is a graph showing a relation between the driving voltage and the intensity (i.e., output) of the signal beam (zeroth order diffracted light beam) from the light modulator element 121 in a case where the light modulator element 121 in the OFF state is brought into the ON state and further to the OFF state at every one writing clock (i.e., at every control unit of time) by the circuit constitution of the first preferred embodiment shown in FIGS. 11 and 12. The reference signs I1, I2, V1 and V2 in the vertical axis are the same as those in FIG. 6. The thick solid line 911 indicates a change in driving voltage and the thick broken line 912 indicates a change in output in the circuit constitution of the first preferred embodiment. The thin solid line 901 and the thin broken line 902 indicate a change in driving voltage and a change in output, respectively, in a case where the transition timing is not shifted.

As shown in FIG. 16, when the light modulator element 121 is turned ON for a period of minimum unit time of the writing operation, at the point of time for state transition from ON to OFF (time T1 of FIG. 16), the oscillation (ringing) of the moving ribbons 121*a* in the light modulator element 121 does not yet converge. Therefore, the voltage varies at the point of time for starting the state transition from ON to OFF in accordance with the shift time, and the state transition changes in accordance with the shift time. For example, as shown in FIG. 16, in the broken line 902 with no shift in transition timing and the broken line 912 with a shift in transition timing, the curves between the times T1 to T2 do not coincide with each other since there is an effect of the oscillation of the moving ribbons 121*a*.

Figure 17:
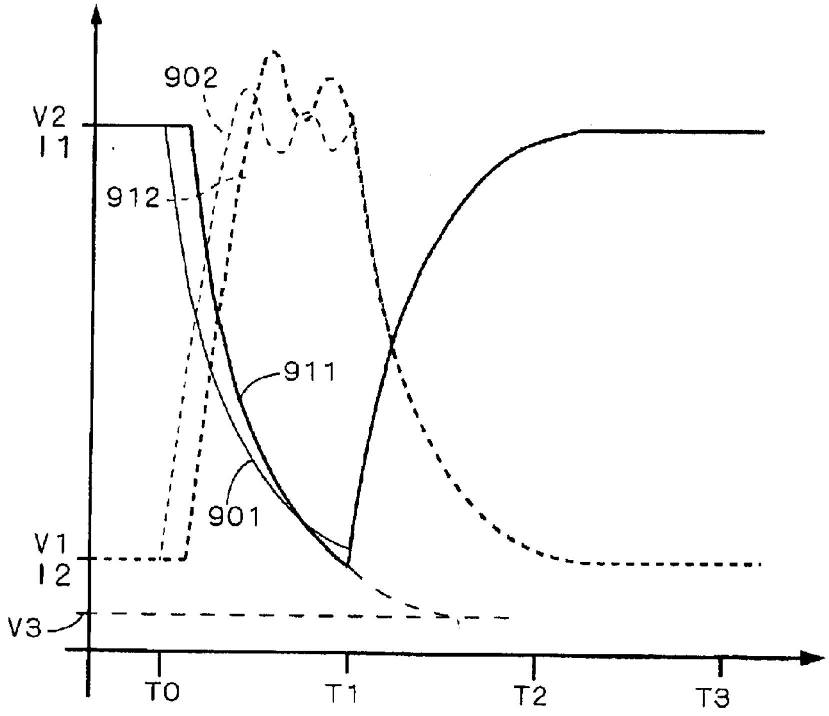

FIG. 17 is a graph showing an exemplary operation of the light modulator element 121 in the image recording apparatus 1 of the second preferred embodiment. In FIG. 17, an auxiliary driving voltage V3, instead of the first driving voltage V1, is applied to the light modulator element 121 when the state of the light modulator element 121 changes from OFF to ON, further to OFF at every one writing clock. This allows such correction in state transition of the light modulator element 121 from ON to OFF as to achieve an appropriate writing. Since the auxiliary driving voltage V3 mainly depends on the output and the shift time, the auxiliary driving voltage V3 may be set higher than or lower than the first driving voltage V1 depending on the shift time.

Figure 18:
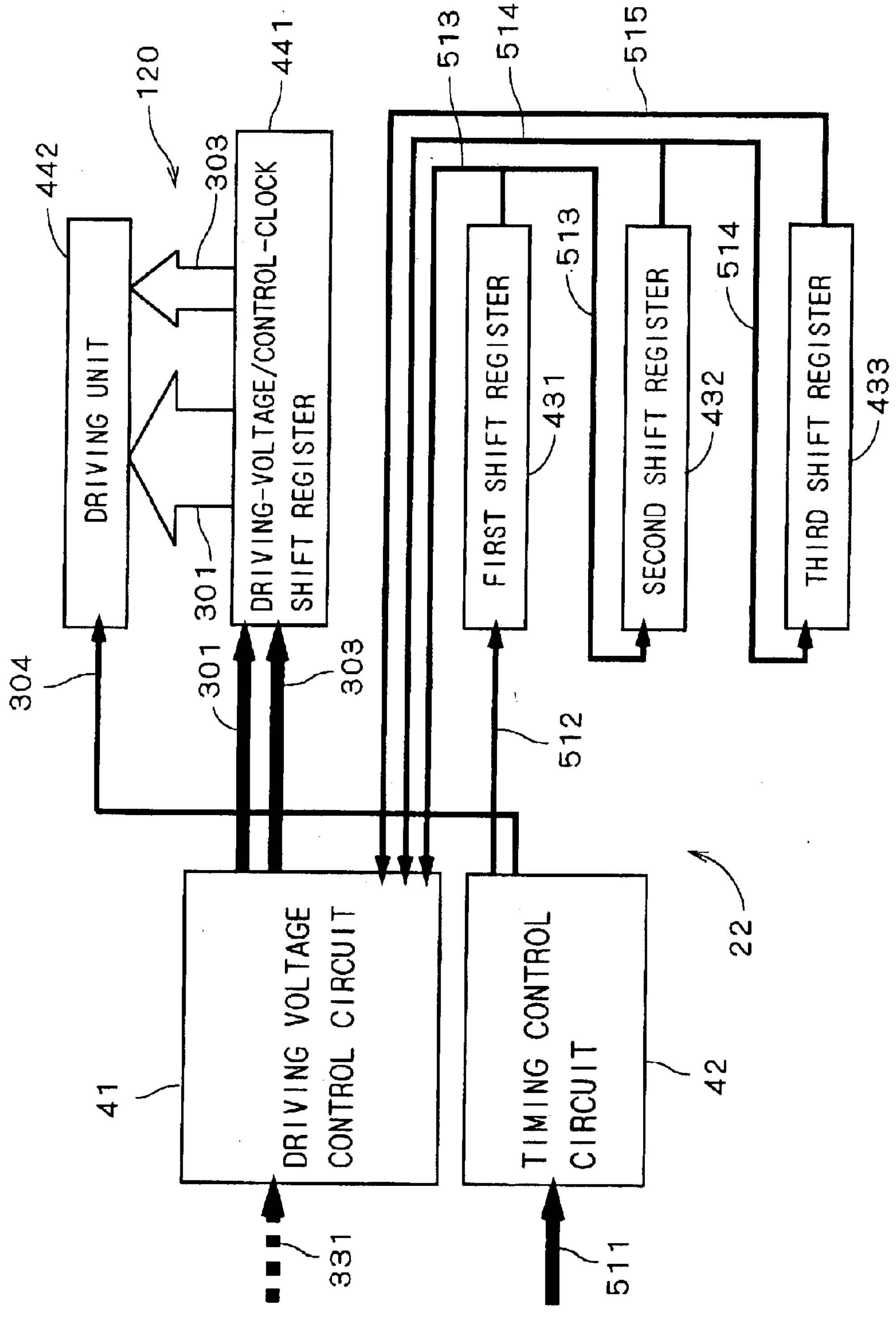
FIG. 18 is a block diagram showing constitutions of a signal processing part and a device driving circuit in accordance with a second preferred embodiment.

FIG. 18 is a block diagram showing constitutions of the signal processing part 22 (see FIG. 1) and the device driving circuit 120, which are used for performing the operation of FIG. 17. In the image recording apparatus 1 of the second preferred embodiment, a third shift register 433 is additionally provided and the inner constitution and the operation of the driving voltage control circuit 41 are different from those in the first preferred embodiment. Other constitution and operation are the same as those in the first preferred embodiment. In FIG. 18, the shift clock 521 and the control signal 522 are omitted.

The third shift register 433 sequentially stores the pixel data 514 from the second shift register 432 in synchronization with the shift clock, and thus the third shift register 433 can store the pixel data as many as the light modulator elements 121 at one time. Then, the third shift register 433 outputs pixel data which is first inputted thereto among the stored pixel data to the driving voltage control circuit 41 as pixel data 515 in synchronization with the shift clock. Therefore, the pixel data 515 from the third shift register 433 lags behind the pixel data 514 from the second shift register 432 by the number of light modulator elements 121. As a result, the three pixel data 513, 514 and 515 which are inputted to the driving voltage control circuit 41 at the same time indicate the states of a specified light modulator element 121 for three writing clocks. The pixel data 514 from the second shift register 432 is data indicating the state of the light modulator element 121 after the next update clock 302.

Figure 19:
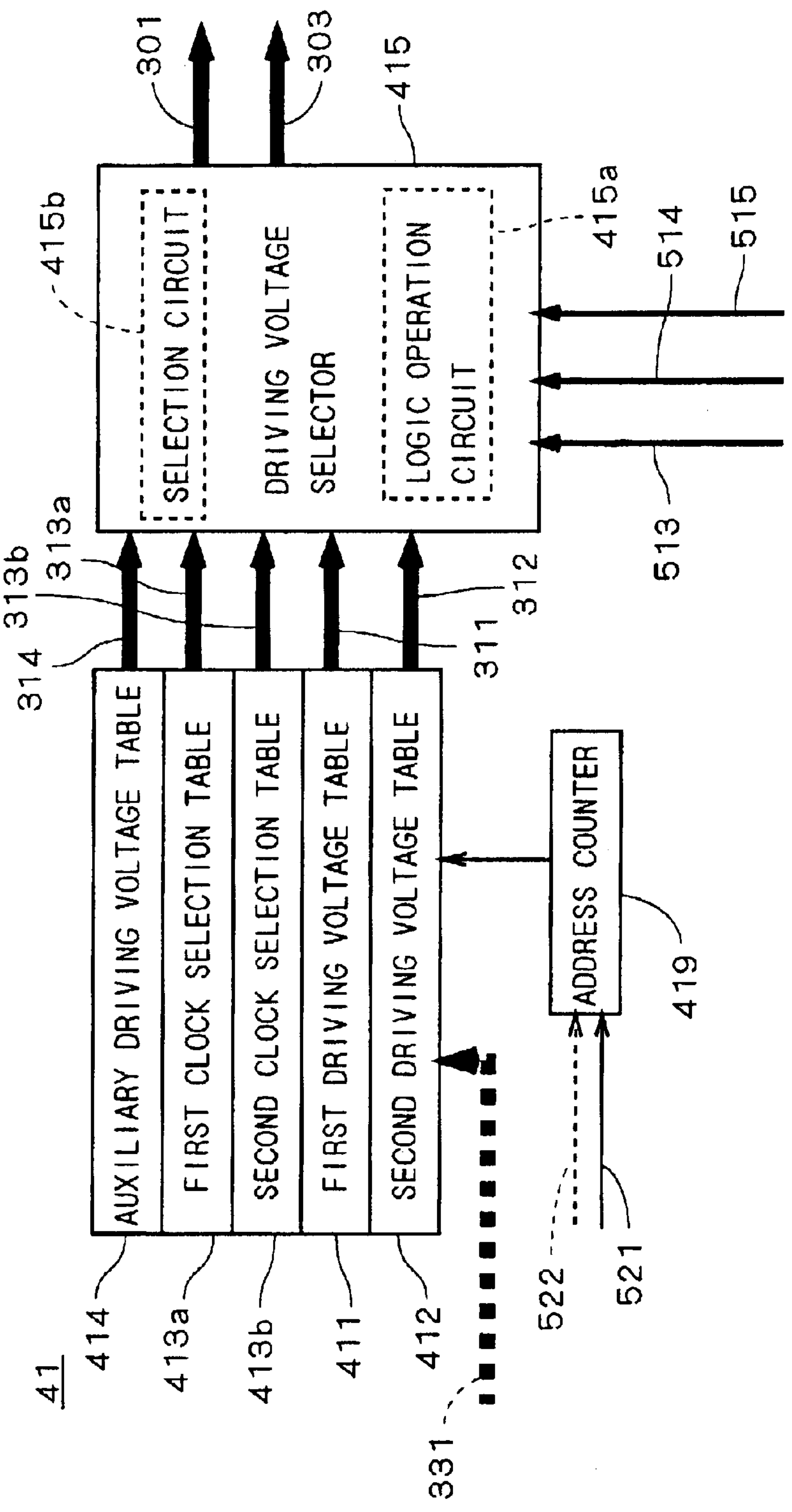
FIG. 19 is a block diagram showing another exemplary constitution of a driving voltage control circuit.

FIG. 19 is a block diagram showing a constitution of the driving voltage control circuit 41 in the second preferred embodiment. The driving voltage control circuit 41 is additionally provided with an auxiliary driving voltage table 414, as compared with that of the first preferred embodiment, and the three pixel data 513 to 515 are inputted to the driving voltage selector 415. In the auxiliary driving voltage table 414, the auxiliary driving voltage V3 at the point of time for state transition from OFF to ON in a case where the state of the light modulator element 121 changes from OFF to ON, further to OFF as shown in FIG. 17 is stored for each light modulator element 121 in advance. The auxiliary driving voltage V3 is obtained in advance as a value to perform an appropriate writing by only one writing clock.

Table 1 shows driving voltage data and clock selection data selected on the basis of the pixel data 513 to 515, and in Table 1, "0" is the pixel data to turn OFF the light modulator element 121 and "1" is the pixel data to turn ON the light modulator element 121.

TABLE 1

| Pixel Data 515 | Pixel Data 514 | Pixel Data 513 | Driving Voltage Data to be Selected | Clock Selection Data to be Selected |
|---|---|---|---|---|
| 0 | 0 | 0 | Second Driving Voltage Data | Second Clock Selection Data |
| 1 | 0 | 0 | Second Driving Voltage Data | Second Clock Selection Data |
| 0 | 1 | 0 | Auxiliary Driving Voltage Data | First Clock Selection Data |
| 1 | 1 | 0 | First Driving Voltage Data | First Clock Selection Data |
| 0 | 0 | 1 | Second Driving Voltage Data | Second Clock Selection Data |
| 1 | 0 | 1 | Second Driving Voltage Data | Second Clock Selection Data |
| 0 | 1 | 1 | First Driving Voltage Data | First Clock Selection Data |
| 1 | 1 | 1 | First Driving Voltage Data | First Clock Selection Data |

As shown in Table 1, as the clock selection data, the first clock selection data 313*a* from the first clock selection table 413*a* is selected when the pixel data 514 is "1", and the second clock selection data 313*b* from the second clock selection table 413*b* is selected when the pixel data 514 is "0". With this, a shift in transition timing is performed at the rise and the fall, like in the first preferred embodiment.

On the other hand, as the driving voltage data, in principle, the first driving voltage data 311 from the first driving voltage table 411 is selected when the pixel data 514 is "1" and the second driving voltage data 312 from the second driving voltage table 412 is selected when the pixel data 514 is "0", but only when the pixel data 515, 514 and 513 are "0", "1" and "0" in this order, the auxiliary driving voltage data 314 from the auxiliary driving voltage table 414 is selected.

With this, the auxiliary driving voltage V3 is inputted to the light modulator element 121 at the point of time for state transition from OFF to ON in the case where the state of the light modulator element 121 changes from OFF to ON, further to OFF as shown in FIG. 17, and it is possible to appropriately perform a writing by one writing clock without being affected by the oscillation of the moving ribbons 121*a* in the state transition from OFF to ON and record a fine image pattern with high precision. Specifically, the minimum line width in the subscan direction can be controlled independently from the other widths.

Figure 20:
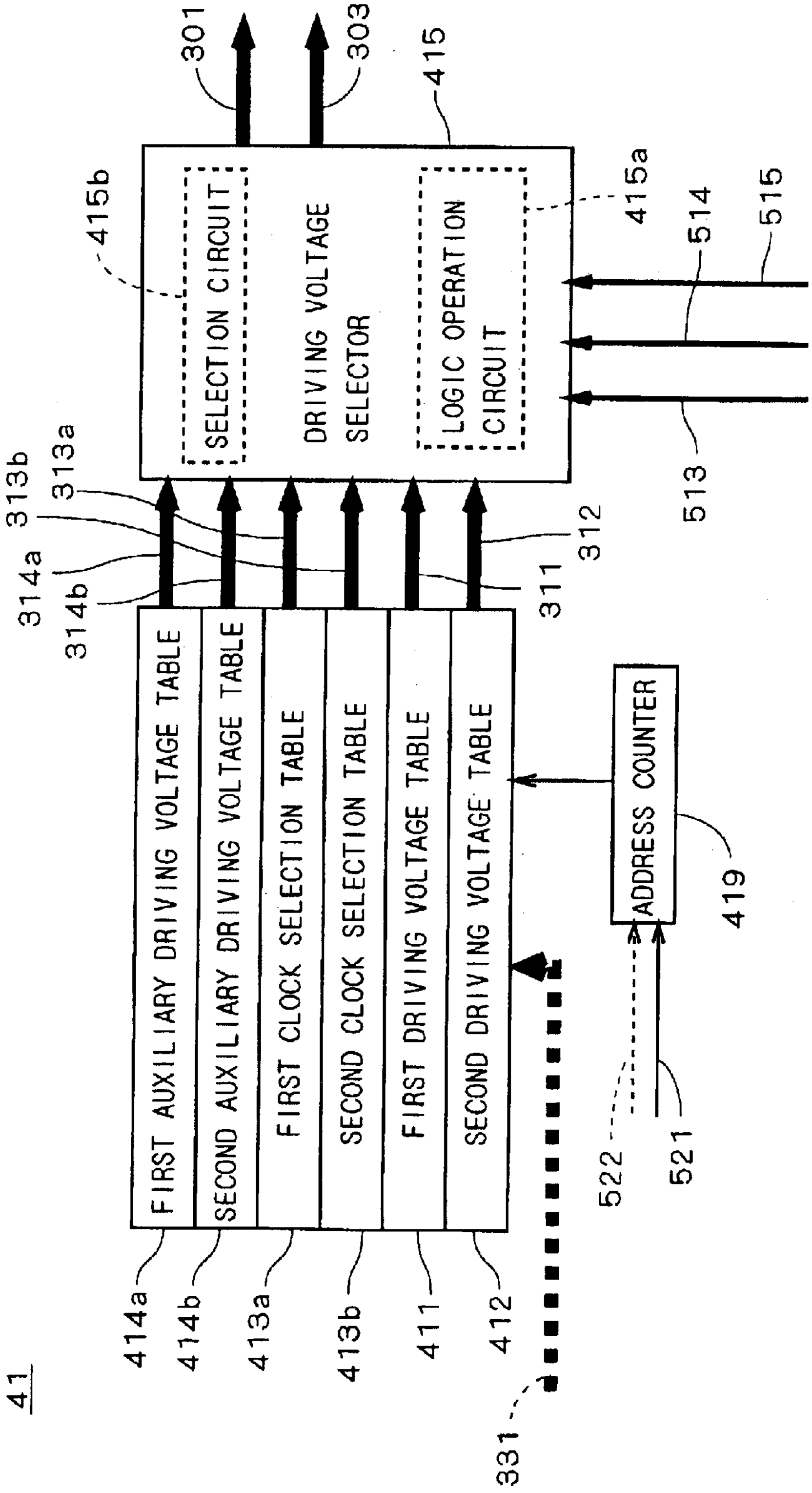
FIG. 20 is a block diagram showing still another exemplary constitution of a driving voltage control circuit.

FIG. 20 is a block diagram showing another exemplary constitution of the driving voltage control circuit 41 in the image recording apparatus 1 of the second preferred embodiment. The driving voltage control circuit 41 of FIG. 20 is additionally provided with a first auxiliary driving voltage table 414*a* and a second auxiliary driving voltage table 414*b*, as compared with the constitution of the first preferred embodiment (see FIG. 12).

The first auxiliary driving voltage table 414*a* performs the same function as the auxiliary driving voltage table 414 of FIG. 19, and i.e., stores the auxiliary driving voltage (hereinafter, referred to as a "first auxiliary driving voltage") applied to each light modulator element 121 at the point of time for state transition from OFF to ON in a case where the state of each light modulator element 121 changes from OFF to ON, further to OFF. The second auxiliary driving voltage table 414*b* stores an auxiliary driving voltage (hereinafter, referred to as a "second auxiliary driving voltage") applied to each light modulator element 121 at the point of time for state transition from ON to OFF in a case where the state of each light modulator element 121 changes from ON to OFF, further to ON.

Table 2 shows driving voltage data and clock selection data selected on the basis of the pixel data 513 to 515, and in Table 2, "0" is the pixel data to turn OFF the light modulator element 121 and "1" is the pixel data to turn ON the light modulator element 121.

solid line 911 indicates a change in driving voltage and the thick broken line 912 indicates a change in output in the image recording apparatus 1 of the first preferred embodiment. The thin solid line 901 and the thin broken line 902 indicate a change in driving voltage and a change in output, respectively, in a case where the transition timing is not shifted.

Figure 21:
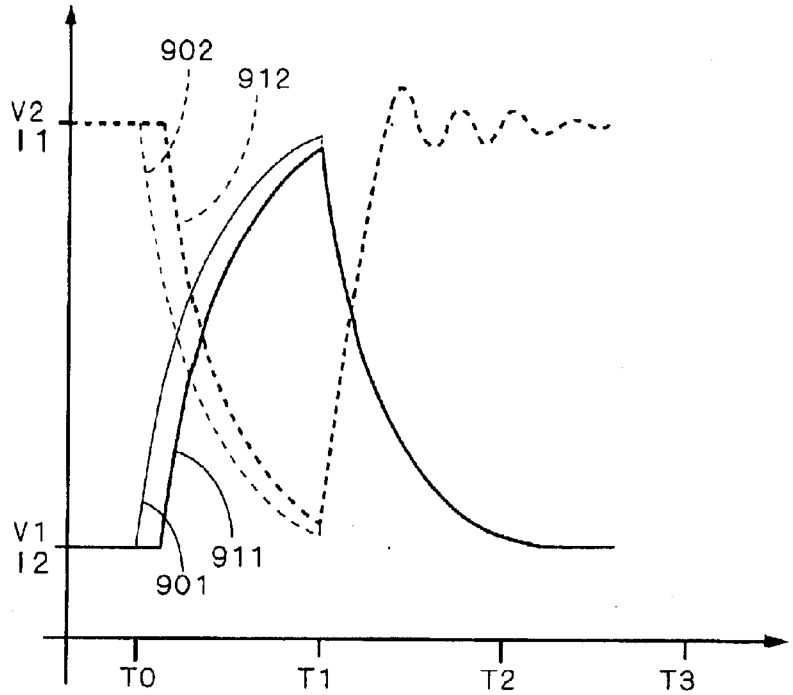
FIGS. 21 and 22 are graphs each showing a relation between a change in driving voltage and an output from the light modulator element.
Figure 22:
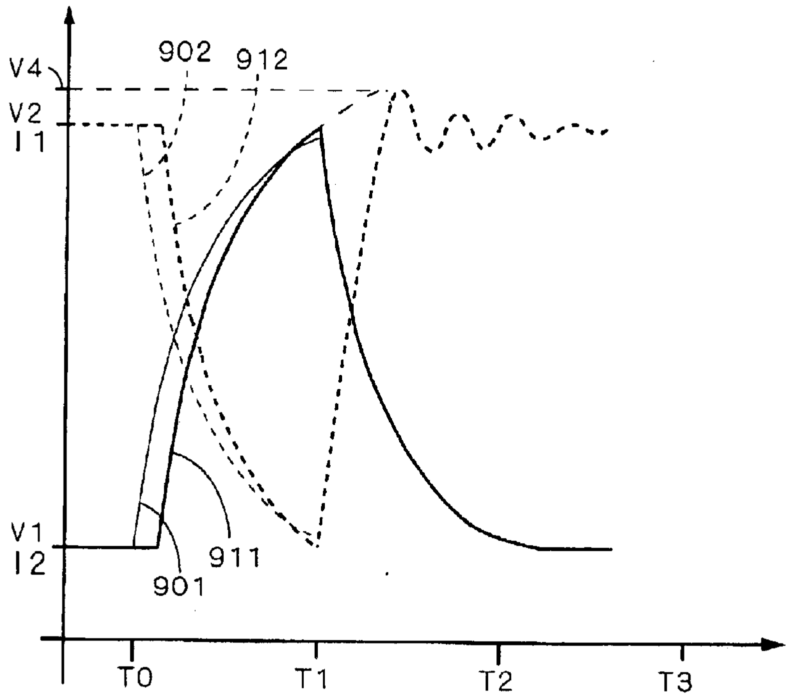

In FIG. 22, the thick solid line 911 and the thick broken line 912 indicate a change in driving voltage and a change in light intensity of the signal beam from the light modulator element 121 in a case where the state of the light modulator element 121 changes from ON to OFF, further to ON at every one writing clock in the image recording apparatus 1 having the driving voltage control circuit 41 of FIG. 20. The thin solid line 901 and the thin broken line 902 are the same as those in FIG. 21, drawn for reference.

As shown in FIG. 21, since the voltage does not efficiently rise to V2 at the time T1, if a state transition start time is shifted from the time T1 by the shift time, the voltage at the time T1 changes in accordance with the shift time. As a result, when the light modulator element 121 in the ON state is brought into OFF, further to ON at every one writing clock, the width in the main scan direction of an area on the recording medium 9 which is not exposed changes in accordance with the shift time. Then, in the driving voltage

TABLE 2

| Pixel Data 515 | Pixel Data 514 | Pixel Data 513 | Driving Voltage Data to be Selected | Clock Selection Data to be Selected |
|---|---|---|---|---|
| 0 | 0 | 0 | Second Driving Voltage Data | Second Clock Selection Data |
| 1 | 0 | 0 | Second Driving Voltage Data | Second Clock Selection Data |
| 0 | 1 | 0 | First Auxiliary Driving Voltage Data | First Clock Selection Data |
| 1 | 1 | 0 | First Driving Voltage Data | First Clock Selection Data |
| 0 | 0 | 1 | Second Driving Voltage Data | Second Clock Selection Data |
| 1 | 0 | 1 | Second Auxiliary Driving Voltage Data | Second Clock Selection Data |
| 0 | 1 | 1 | First Driving Voltage Data | First Clock Selection Data |
| 1 | 1 | 1 | First Driving Voltage Data | First Clock Selection Data |

As shown in Table 2, as the clock selection data, the first clock selection data 313*a* from the first clock selection table 413*a* is selected when the pixel data 514 is "1", and the second clock selection data 313*b* from the second clock selection table 413*b* is selected when the pixel data 514 is "0".

On the other hand, as the driving voltage data, in principle, the first driving voltage data 311 from the first driving voltage table 411 is selected when the pixel data 514 is "1" and the second driving voltage data 312 from the second driving voltage table 412 is selected when the pixel data 514 is "0", but the first auxiliary driving voltage data 314*a* from the first auxiliary driving voltage table 414*a* is selected when the pixel data 515, 514 and 513 are "0", "1" and "0" in this order, and the second auxiliary driving voltage data 314*b* from the second auxiliary driving voltage table 414*b* is selected when the pixel data 515, 514 and 513 are "1", "0" and "1" in this order.

FIGS. 21 and 22 are graphs used for explaining the function of the second auxiliary driving voltage. FIG. 21 is a graph showing a relation between the driving voltage and the intensity (i.e., output) of the signal beam (zeroth order diffracted light beam) from the light modulator element 121 in a case where the state of the light modulator element 121 changes from ON to OFF, further to ON at every one writing clock in the image recording apparatus 1 of the first preferred embodiment. The reference signs I1, I2, V1 and V2 in the vertical axis are the same as those in FIG. 6. The thick control circuit 41 of FIG. 20, as shown in FIG. 22, the second auxiliary driving voltage V4 is applied to the light modulator element 121 at the time T1 to sufficiently reduce the output from the light modulator 12.

Thus, the driving voltage control circuit 41 of FIG. 20 selects the first auxiliary driving voltage V3 when the state of the light modulator element 121 changes from OFF to ON, further to OFF and selects the second auxiliary driving voltage V4 when the state of the light modulator element 121 changes from ON to OFF, further to ON, to allow an appropriate exposure, even if the writing is performed for only one writing unit of time or the writing is not performed for only one writing unit of time, and therefore a fine image pattern can be recorded with high precision. Specifically, the width of the minimum line and the width of minimum linear space which extend in the subscan direction can be controlled independently from other widths.

Figure 23:
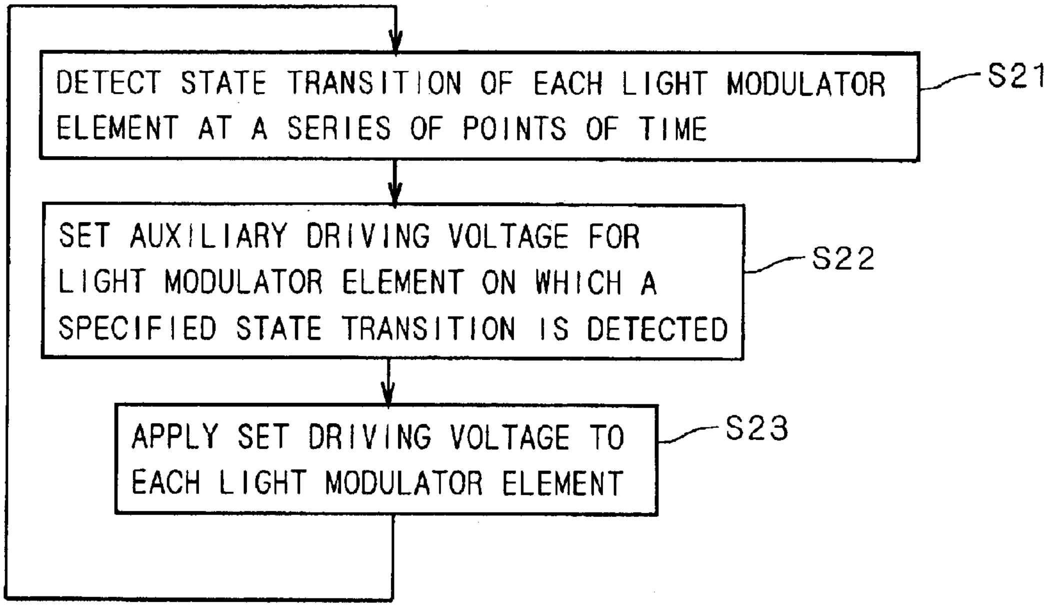
FIG. 23 is a flowchart showing an operation flow for controlling the light modulator elements in accordance with the second preferred embodiment.

When the operation by the constitutions of FIGS. 18 to 20 is seen from a functional point of view with reference to FIG. 23, the state transition of each light modulator element 121 in a series of points of time is detected by the logic operation circuit 415*a* in the driving voltage selector 415 (see FIGS. 19 and 20) with the pixel data 513 to 515 from the first shift register 431 to the third shift register 433, respectively (Step S21), the selection circuit 415*b* in the driving voltage selector 415 sets the driving voltage depending on whether a specified state transition is detected or not (Step S22), and consequently, when the specified state transition is detected, the auxiliary driving voltage which is different from a normal driving voltage is applied to the corresponding light modulator element 121 (Step S23). While the shift in transition timing shown in FIG. 13 is also performed concurrently with the above operation, the detection of state transition of Step S11 is performed as part of Step S21 and the Step S13 and the Step S23 are performed as the same step.

<3. The Third Preferred Embodiment>

Figure 24:
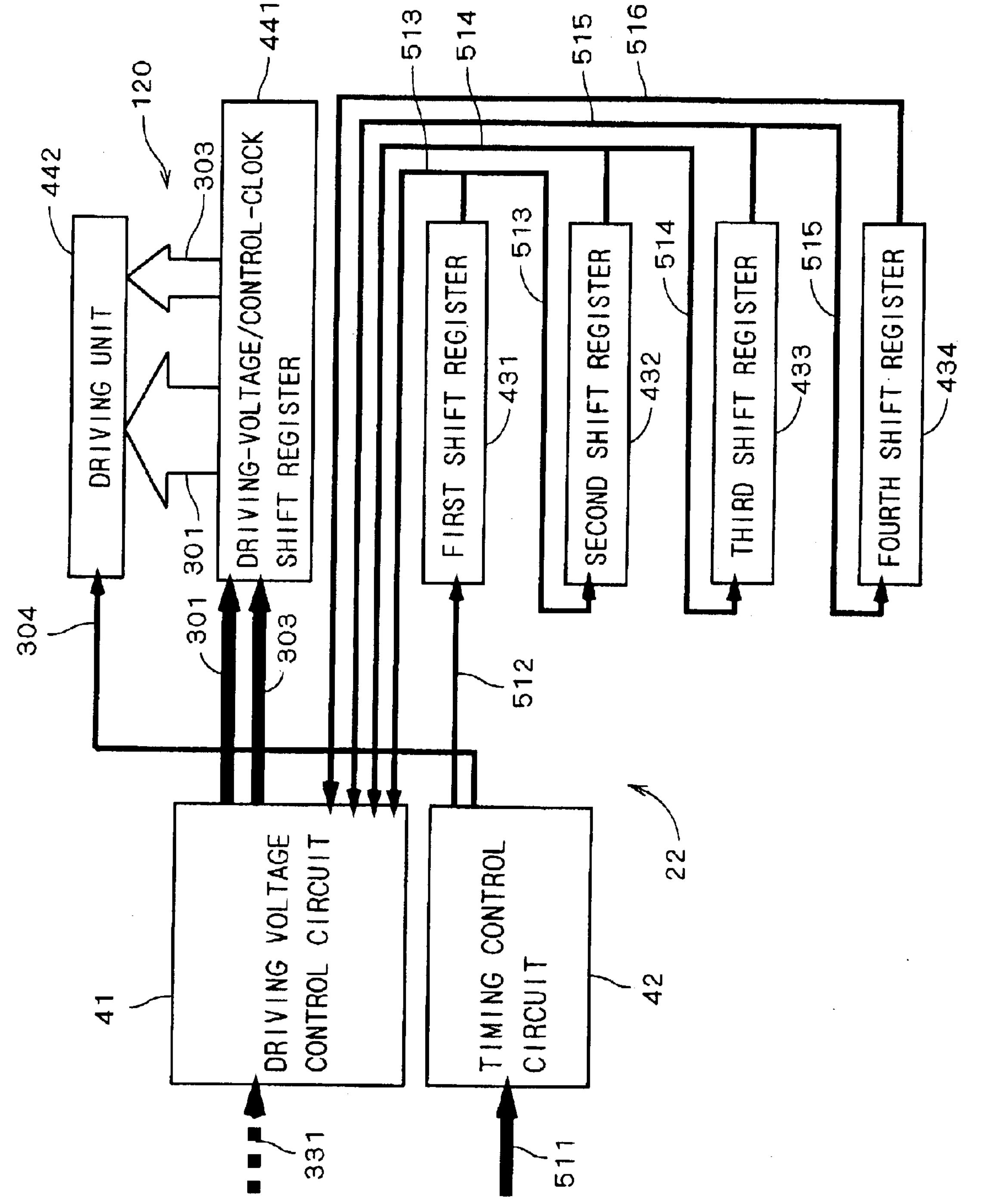
FIG. 24 is a block diagram showing constitutions of a signal processing part and a device driving circuit in accordance with a third preferred embodiment.

FIG. 24 is a block diagram showing constitutions of the signal processing part 22 (see FIG. 1) and the device driving circuit 120 in the image recording apparatus 1 of the third preferred embodiment. In the image recording apparatus 1 of the third preferred embodiment, a fourth shift register 434 is additionally provided and the inner constitution and the operation of the driving voltage control circuit 41 are different from those in the second preferred embodiment. Other constitution and operation are the same as those in the second preferred embodiment. In the third preferred embodiment, it is assumed that the interval of the control clocks to be inputted to the clock selection part 442*a* of FIG. 5 is sufficiently small (in other words, the group of control clocks 304 has a sufficient timing resolution).

The fourth shift register 434 is the same as the third shift register 433, and i.e., sequentially stores the pixel data 515 from the third shift register 433 in synchronization with the shift clock and outputs pixel data which is first inputted thereto among the stored pixel data to the driving voltage control circuit 41 as pixel data 516 in synchronization with the shift clock. Therefore, the pixel data 516 from the fourth shift register 434 lags behind the pixel data 515 from the third shift register 433 by the number of light modulator elements 121. As a result, the four pixel data 513, 514, 515 and 516 which are inputted to the driving voltage control circuit 41 at the same time indicate the states of a specified light modulator element 121 for four writing clocks. The pixel data 514 from the second shift register 432 is data indicating the state of the light modulator element 121 after the next update clock 302.

Figure 25:
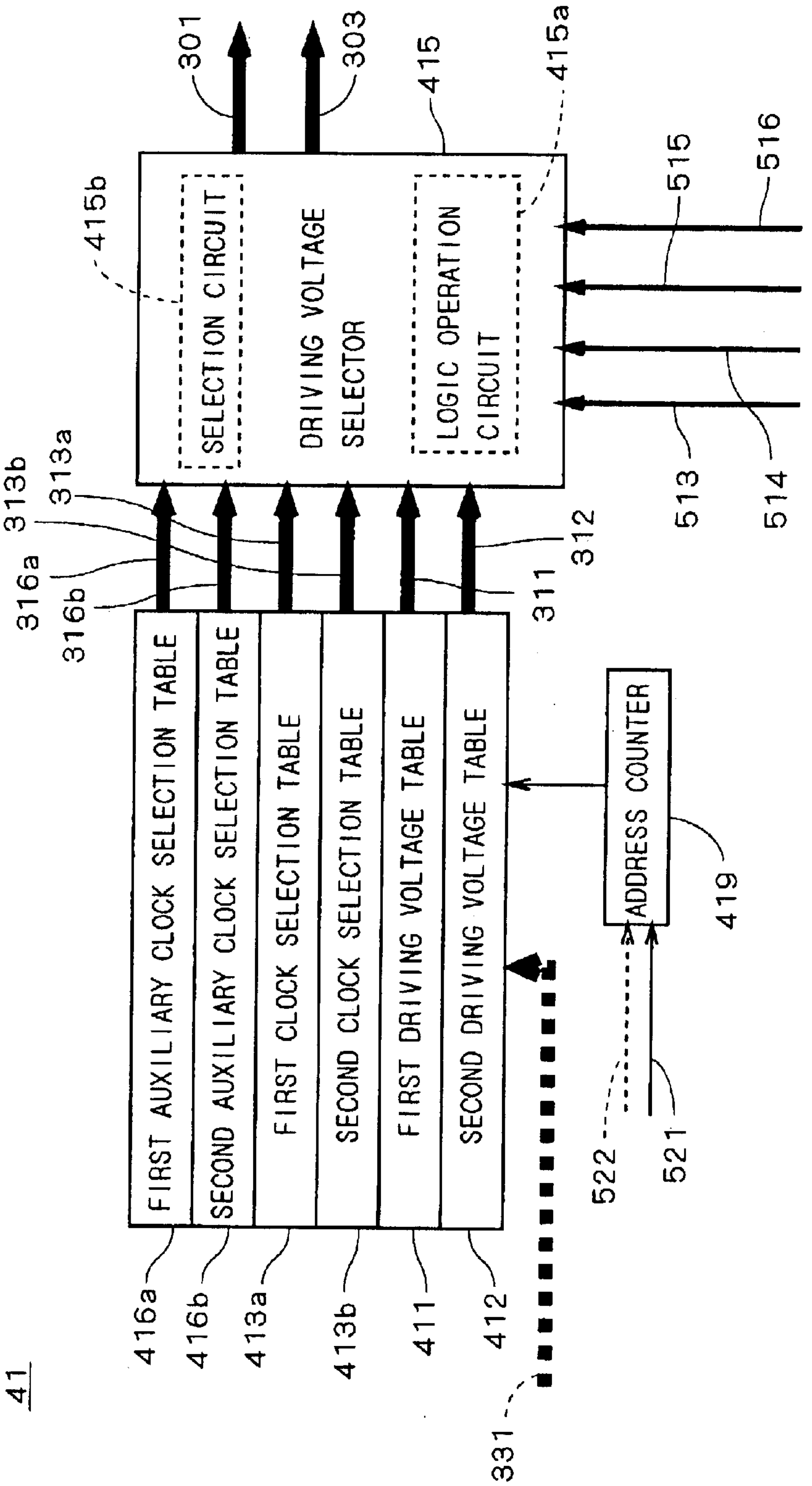
FIG. 25 is a block diagram showing a constitution of a driving voltage control circuit in accordance with a third preferred embodiment.

FIG. 25 is a block diagram showing a constitution of the driving voltage control circuit 41 in the third preferred embodiment. The driving voltage control circuit 41 is additionally provided with a first auxiliary clock selection table 416*a* and a second auxiliary clock selection table 416*b*, as compared with that of the first preferred embodiment, and the four pixel data 513 to 516 are inputted to the driving voltage selector 415.

Table 3 shows driving voltage data and clock selection data selected on the basis of the pixel data 513 to 516, and in Table 3, “0” is the pixel data to turn OFF the light modulator element 121 and “1” is the pixel data to turn ON the light modulator element 121. Further, “–” in Table 3 indicates that both “0” and “1” are available.

[TABLE 3]

| Pixel Data 516 | Pixel Data 515 | Pixel Data 514 | Pixel Data 513 | Driving Voltage Data to be Selected | Clock Selection Data to be Selected |
|---|---|---|---|---|---|
| — | 0 | 0 | 0 | Second Driving Voltage Data | Second Clock Selection Data |
| 0 | 1 | 0 | 0 | Second Driving Voltage Data | Second Auxiliary Clock Selection Data |
| 1 | 1 | 0 | 0 | Second Driving Voltage Data | Second Clock Selection Data |
| — | 0 | 1 | 0 | First Driving Voltage Data | First Auxiliary Clock Selection Data |
| — | 1 | 1 | 0 | First Driving Voltage Data | First Clock Selection Data |
| — | 0 | 0 | 1 | Second Driving Voltage Data | Second Clock Selection Data |
| — | 1 | 0 | 1 | Second Driving Voltage Data | Second Clock Selection Data |
| — | 0 | 1 | 1 | First Driving Voltage Data | First Clock Selection Data |
| — | 1 | 1 | 1 | First Driving Voltage Data | First Clock Selection Data |

As shown in Table 3, as the driving voltage data, the first driving voltage data 311 from the first driving voltage table 411 is selected when the pixel data 514 is “1 ”, and the second driving voltage data 312 from the second driving voltage table 412 is selected when the pixel data 514 is “0”.

On the other hand, as the clock selection data, in principle, the first clock selection data 313*a* from the first clock selection table 413*a* is selected when the pixel data 514 is “1” and the second clock selection data 313*b* from the second clock selection table 413*b* is selected when the pixel data 514 is “0”, but second auxiliary clock selection data 316*b* from a second auxiliary clock selection table 416*b* is selected when the pixel data 516, 515 and 514 are “0”, “1” and “0” in this order, and the first auxiliary clock selection data 316*a* from a first auxiliary clock selection tablet 416*a* is selected when the pixel data 515, 514 and 513 are “0”, “1” and “0” in this order.

With this, a shift time for the state transition from OFF to ON and a shift time for the state transition from ON to OFF in a case where the state of the light modulator element 121 changes from OFF to ON, further to OFF can be independently set, and therefore it is possible to record a fine image pattern with high precision in consideration of the effect of the oscillation in output from the light modulator element 121.

Through a method based upon the above method, a shift time for the state transition from ON to OFF and a shift time for the state transition from OFF to ON in a case where the state of the light modulator element 121 changes from ON to OFF, further to ON can be independently set. In this case, two more auxiliary clock selection tables are additionally provided (when selections out of the four auxiliary clock selection tables coincide, one out of the tables which make the coincident selections is used). There may be a case where an auxiliary shift time is used only when the state of the light modulator element 121 changes from ON to OFF or from OFF to ON in specified series of state transitions.

Figure 26:
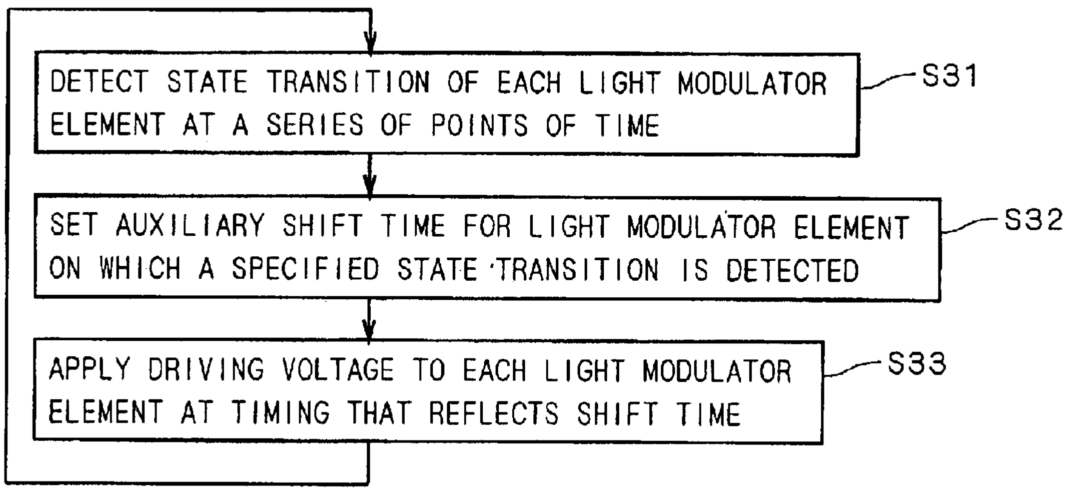
FIG. 26 is a flowchart showing an operation flow for controlling the light modulator elements in accordance with the third preferred embodiment.

When the operation by the constitutions of FIGS. 24 and 25 is seen from a functional point of view with reference to FIG. 26, the state transition of each light modulator element 121 in a series of points of time is detected by logic operation circuit 415*a* (see FIG. 25) of the driving voltage selector 415 with the pixel data 513 to 516 from the first shift register 431 to the fourth shift register 434, respectively (Step S31), the selection circuit 415*b* in the driving voltage selector 415 sets the shift time depending on whether a specified state transition is detected or not (Step S32), and consequently, when the specified state transition is detected, the transition timing of the corresponding light modulator element 121 is shifted with the auxiliary shift time which is different from a normal shift time (Step S33).

Figure 13:
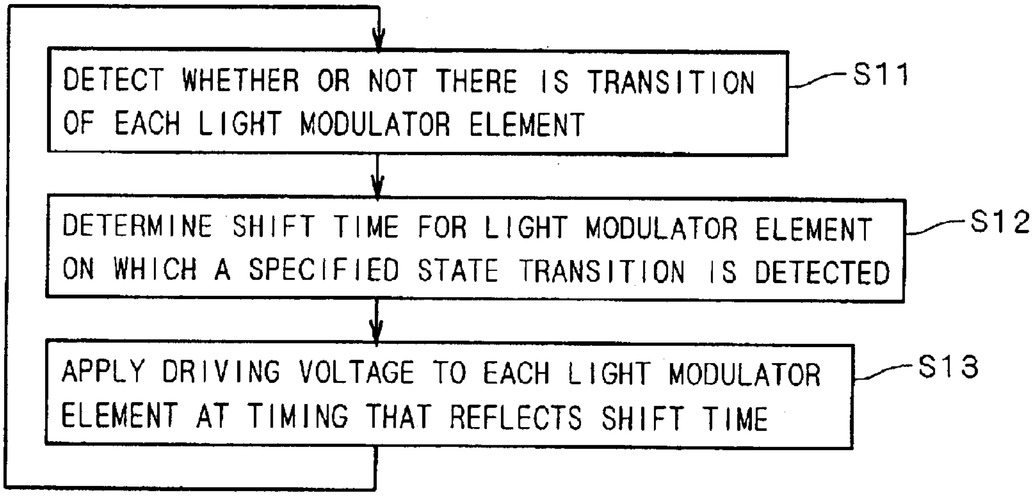
FIG. 13 is a flowchart showing an operation flow for controlling the light modulator elements in accordance with the first preferred embodiment.

Since the operation for normal shift in transition timing shown in FIG. 13 and the operation of FIG. 26 are performed concurrently, actually, Step S11 is performed as part of Step S31, Step S12 is performed together with Step S32, and the Step S33 is the same as Step S13.

<4. Variation>

Though the preferred embodiments of the present invention have been discussed above, the present invention is not limited to the above-discussed preferred embodiments, but allows various variations.

The recording medium 9 may be traveled by other methods only if it can move relatively to the optical head 10. For example, there may be a constitution in which the recording medium 9 is held on a planar stage and the stage can be traveled relatively to the optical head 10.

The constitutions of circuits shown in FIGS. 11, 12, 18 to 20, 24 and 25 are examples, and other constitution may be adopted and part of it may be achieved by software.

If the moving ribbons 121*a* and the fixed ribbons 121*b* can be regarded as strip-like reflection surfaces, these surfaces do not have to be in a ribbon shape in a strict meaning. For example, an upper surface of a block shape may serve as the reflection surface of a fixed ribbon.

Though the zeroth order diffracted light beam is used as the signal beam in the beam writing in the above preferred embodiments, the first order diffracted light beams may be used as the signal beam. Unlike the relative positional relation between the moving ribbons 121*a* which are not sagged and the fixed ribbons 121*b* in the above preferred embodiments, the light modulator element 121 which emits the zeroth order diffracted light beam in the state where the moving ribbons 121*a* sag may be used. In these cases, by controlling (shifting) the state transition timing in accordance with the state transition characteristics of the light modulator element 121, it is possible to achieve an appropriate image recording.

While the auxiliary driving voltage is set when the specified series of state transitions are detected in the second preferred embodiment and the auxiliary shift time is set when the specified series of state transitions are detected in the third preferred embodiment, the specified series of state transitions are not limited to those discussed in the above preferred embodiments. When the cycle of the writing clock is very short, for example, there is a possible case where the oscillation in output does not converge or the output is not yet sufficiently shifted, even after two writing clocks. In this case, the auxiliary driving voltage or the auxiliary shift time may be set in a higher level by detecting the state transition over four writing clocks.

On the other hand, in the second preferred embodiment, instead of distinguishing the auxiliary driving voltage from the first driving voltage and the second driving voltage, the auxiliary driving voltage may be regarded as one of a group of driving voltages. In this case, the operation of the image recording apparatus 1 can be understood as setting the driving voltage for each light modulator element 121 in accordance with the state transition in a series of points of time. Similarly, in the third preferred embodiment, instead of distinguishing the auxiliary shift time from the first shift time and the second shift time, the auxiliary shift time may be regarded as one of a group of shift times. In this case, the operation of the image recording apparatus 1 can be understood as setting the shift time for each light modulator element 121 in accordance with the state transition in a series of points of time.

Figure 27:
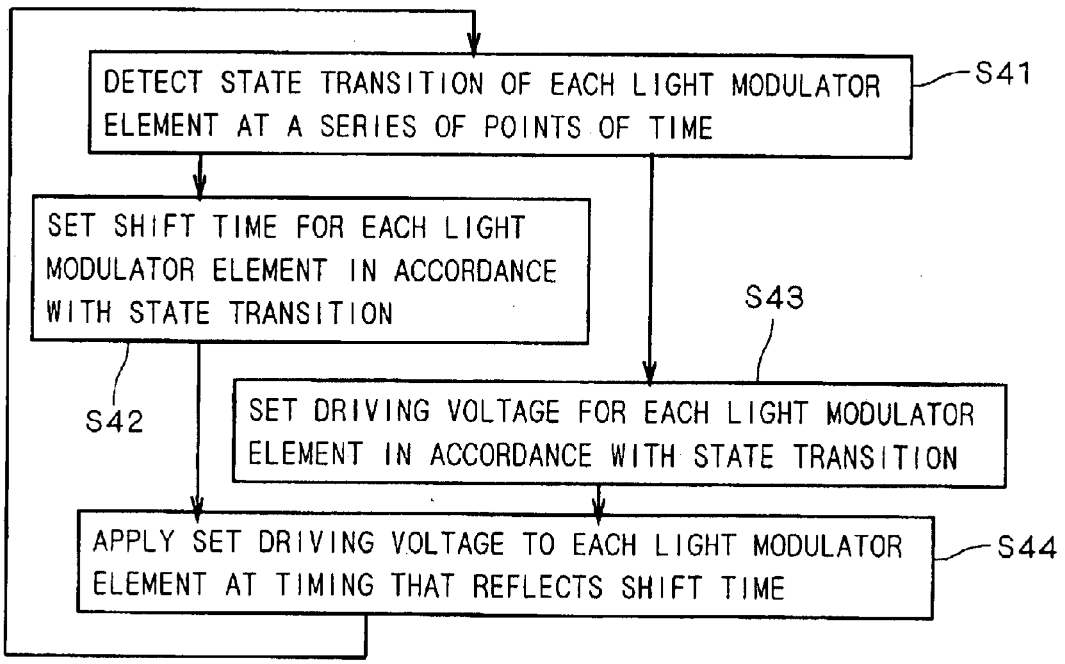
FIG. 27 is a flowchart showing a concept of controlling the light modulator elements in the image recording apparatus.

FIG. 27 is a flowchart showing an operation flow in a case where the operations of the image recording apparatus 1 in the second and third preferred embodiments are understood as above and the operations in these preferred embodiments are performed in conjunction with each other. In the operation of FIG. 27, the state transition of each light modulator element 121 in a series of points of time is first detected (Step S41) and the shift time and the driving voltage for the light modulator element 121 are individually obtained (Steps S42 and S43). After that, the driving voltage which is set while the transition timing is shifted by the shift time is applied to the light modulator element 121 (Step S44). This achieves a high-level control in consideration of the characteristics of the light modulator element 121, the installation attitude of the light modulator 12, the influence of the optical system, the photosensitive characteristics of the recording medium 9, the influence of noise in calibration for data setting and the like, and makes it possible to record a fine image pattern with high precision. The first to third preferred embodiments only show part of the operation shown in FIG. 27.

The light modurator element 121 is not limited to the diffraction grating type one, but may be a DMD (Digital Micromirror Device) or the like. Further, the light modulator element 121 is not limited to one that reflects a light beam, but a laser array, for example, may perform the function as the light modulator element 121. Also in this case, an appropriate image recording can be achieved by shifting the transition timing in accordance with the width and the positional shift of the irradiation area of the light beam from each laser element in the main scan direction.

As the detection part 71, elements other than the group of light receiving elements 72 which are arranged two-dimensionally can be also used. For example, by scanning a plurality of light receiving elements arranged in the main scan direction with the optical head 10 in the subscan direction, the width of the irradiation area of the signal beam from each light modulator element 121 in the main scan direction (further, the width thereof in the subscan direction) and the like may be detected.

While the invention has been shown and described in detail, the foregoing description is in all aspects illustrative and not restrictive. It is therefore understood that numerous modifications and variations can be devised without departing from the scope of the invention.

What is claimed is:

1. An image recording apparatus for recording an image on a recording medium by exposure, comprising:

a light modulator having a plurality of light modulator elements;

a holding part for holding a recording medium on which an image is recorded with signal beams from said plurality of light modulator elements;

a transfer mechanism for transferring said holding part relatively to said light modulator;

a state transition detection circuit for detecting whether or not there is a transition between a state of emitting a signal beam and a state of emitting no signal beam on each of said plurality of light modulator elements; and a control circuit for shifting a transition timing of each light modulator element on which said transition is detected in accordance with a detection result of said state transition detection circuit.

2. The image recording apparatus according to claim 1, further comprising a shift time memory for storing respective shift times for said plurality of light modulator elements to be used in shifts by said control circuit.

3. The image recording apparatus according to claim 2, wherein said shift time memory stores shift times in transition from a state of emitting a signal beam to a state of emitting no signal beam and shift times in transition from a state of emitting no signal beam to a state of emitting a signal beam.

4. The image recording apparatus according to claim 1, further comprising:

a beam sensor for detecting respective widths of irradiation areas irradiated by said plurality of light modulator elements in a scanning direction; and a shift time calculation circuit for calculating respective shift times for said plurality of light modulator elements to be used in shifts by said control circuit on the basis of said widths of said irradiation areas in said scan direction.

5. The image recording apparatus according to claim 4, wherein said beam sensor has a group of light receiving elements which are two-dimensionally arranged.

6. The image recording apparatus according to claim 5, wherein each of said plurality of light modulator elements is a light modulator element of diffraction grating type in which strip-like fixed reflection surfaces and strip-like moving reflection surfaces are alternately arranged, said group of light receiving elements detect respective intensities of signal beams from said plurality of light modulator elements, and said control circuit controls respective driving voltages to be applied to said plurality of light modulator elements on the basis of said intensities of said signal beams.

7. The image recording apparatus according to claim 6, wherein said group of light receiving elements detect respective widths of irradiation areas irradiated by said plurality of light modulator elements in a direction orthogonal to said scan direction, and said control circuit controls respective driving voltages to be applied to said plurality of light modulator elements on the basis of said intensities of said signal beams and said widths in said direction orthogonal to said scan direction.

8. The image recording apparatus according to claim 1, wherein a beam sensor for detecting respective positional shifts of irradiation areas irradiated by said plurality of light modulator elements in a scan direction; and a shift time calculation circuit for calculating respective shift times for said plurality of light modulator elements to be used in shifts by said control circuit on the basis of said positional shifts of said irradiation areas in said scan direction.

9. The image recording apparatus according to claim 8, wherein said beam sensor has a group of light receiving elements which are two-dimensionally arranged.

10. The image recording apparatus according to claim 9, wherein each of said plurality of light modulator elements is a light modulator element of diffraction grating type in which strip-like fixed reflection surfaces and strip-like moving reflection surfaces are alternately arranged, said group of light receiving elements detect respective intensities of signal beams from said plurality of light modulator elements, and said control circuit controls respective driving voltages to be applied to said plurality of light modulator elements on the basis of said intensities of said signal beams.

11. The image recording apparatus according to claim 10, wherein said group of light receiving elements detect respective widths of irradiation areas irradiated by said plurality of light modulator elements in a direction orthogonal to said scan direction, and said control circuit controls respective driving voltages to be applied to said plurality of light modulator elements on the basis of said intensities of said signal beams and said widths in said direction orthogonal to said scan direction.

12. The image recording apparatus according to claim 1, wherein each of said plurality of light modulator elements is a light modulator element of diffraction grating type in which strip-like fixed reflection surfaces and strip-like moving reflection surfaces are alternately arranged.

13. The image recording apparatus according to claim 12, wherein said control circuit controls respective driving voltages to be applied to said plurality of light modulator elements.

14. The image recording apparatus according to claim 1, wherein said state transition detection circuit detects a state transition of each of said plurality of light modulator elements in a series of points of time, and said control circuit applies an auxiliary driving voltage which is different from a normal driving voltage to each light modulator element on which a specified state transition is detected.

15. The image recording apparatus according to claim 14, wherein each of said plurality of light modulator elements is a light modulator element of diffraction grating type in which strip-like fixed reflection surfaces and strip-like moving reflection surfaces are alternately arranged, and said specified state transition is a state transition from a state of emitting no signal beam to a state of emitting a signal beam, further to a state of emitting no signal beam at every control unit of time.

16. The image recording apparatus according to claim 14, wherein each of said plurality of light modulator elements is a light modulator element of diffraction grating type in which strip-like fixed reflection surfaces and strip-like moving reflection surfaces are alternately arranged, and said specified state transition is a state transition from a state of emitting a signal beam to a state of emitting no signal beam, further to a state of emitting a signal beam at every control unit of time.

17. The image recording apparatus according to claim 14, further comprising:

a driving voltage memory for storing driving voltages corresponding to a state of emitting a signal beam and driving voltages corresponding to a state of emitting no signal beam for said plurality of light modulator elements, respectively; and a auxiliary driving voltage memory for storing auxiliary driving voltages for said plurality of light modulator elements, respectively.

18. The image recording apparatus according to claim 15, wherein another specified state transition is a state transition from a state of emitting a signal beam to a state of emitting no signal beam, further to a state of emitting a signal beam at every control unit of time.

19. The image recording apparatus according to claim 18, further comprising:

a driving voltage memory for storing driving voltages corresponding to a state of emitting a signal beam and driving voltages corresponding to a state of emitting no signal beam for said plurality of light modulator elements, respectively; and a auxiliary driving voltage memory for storing auxiliary driving voltages corresponding to said specified state transition and auxiliary driving voltages corresponding to said another specified state transition.

20. The image recording apparatus according to claim 1, wherein said state transition detection circuit detects a state transition of each of said plurality of light modulator elements in a series of points of time, and said control circuit shifts a driving timing of each light modulator element on which a specified state transition is detected by an auxiliary shift time which is different from a normal shift time.

21. The image recording apparatus according to claim 20, further comprising an auxiliary shift time memory for storing auxiliary shift times for said plurality of light modulator elements, respectively.

22. The image recording apparatus according to claim 20, wherein each of said plurality of light modulator elements is a light modulator element of diffraction grating type in which strip-like fixed reflection surfaces and strip-like moving reflection surfaces are alternately arranged, and said specified state transition is a state transition from a state of emitting no signal beam to a state of emitting a signal beam, further to a state of emitting no signal beam at every control unit of time.

23. The image recording apparatus according to claim 20, wherein each of said plurality of light modulator elements is a light modulator element of diffraction grating type in which strip-like fixed reflection surfaces and strip-like moving reflection surfaces are alternately arranged, and said specified state transition is a state transition from a state of emitting a signal beam to a state of emitting no signal beam, further to a state of emitting a signal beam at every control unit of time.

24. The image recording apparatus according to claim 21, wherein said auxiliary shift time memory stores auxiliary shift times in a transition from a state of emitting no signal beam to a state of emitting a signal beam and auxiliary shift times in a transition from a state of emitting a signal beam to a state of emitting no signal beam.

25. An image recording apparatus for recording an image on a recording medium by exposure, comprising:

a light modulator having a plurality of light modulator elements;

a holding part for holding a recording medium on which an image is recorded with signal beams from said plurality of light modulator elements;

a transfer mechanism for transferring said holding part relatively to said light modulator;

a state transition detection circuit for detecting a series of state transitions between a state of emitting a signal beam and a state of emitting no signal beam on each of said plurality of light modulator elements; and a control circuit for shifting a transition timing of each of said plurality of light modulator elements in accordance with said series of state transitions.

26. The image recording apparatus according to claim 25, wherein each of said plurality of light modulator elements is a light modulator element of diffraction grating type in which strip-like fixed reflection surfaces and strip-like moving reflection surfaces are alternately arranged.

27. The image recording apparatus according to claim 25, wherein said control circuit applies driving voltages to said plurality of light modulator elements, respectively, in accordance with said series of state transitions.

28. An image recording method of recording an image on a recording medium with signal beams from a light modulator having a plurality of light modulator elements, comprising the steps of:

detecting whether or not there is a transition between a state of emitting a signal beam and a state of emitting no signal beam on each of said plurality of light modulator elements;

determining shift times in transition timing of light modulator elements, respectively, on which said transition is detected in accordance with a detection result on state transition; and applying driving voltages to said plurality of light modulator elements at timings reflecting said shift times, respectively.

29. The method according to claim 28, further comprising the steps of:

detecting a state transition in a series of points of time on each of said plurality of light modulator elements; and setting an auxiliary driving voltage for each light modulator element which makes a specified state transition.

30. The method according to claim 29, further comprising the step of setting an auxiliary shift time for each light modulator element which makes a specified state transition.

31. The method according to claim 28, further comprising the steps of:

detecting a state transition in a series of points of time on each of said plurality of light modulator elements; and setting an auxiliary shift time for each light modulator element which makes a specified state transition.

* * * * *